US009674578B2

(12) United States Patent
Kim et al.

(10) Patent No.: US 9,674,578 B2
(45) Date of Patent: *Jun. 6, 2017

(54) ELECTRONIC DEVICE AND METHOD FOR INFORMATION ABOUT SERVICE PROVIDER

(71) Applicant: LG ELECTRONICS INC., Seoul (KR)

(72) Inventors: Leena Kim, Pyeongtaek-si (KR); Youngjae Seo, Pyeongtaek-si (KR); Hyunhee Yoon, Pyeongtaek-si (KR); Jungwoo Lee, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/532,691

(22) Filed: Nov. 4, 2014

(65) Prior Publication Data

US 2015/0058897 A1 Feb. 26, 2015

Related U.S. Application Data

(63) Continuation of application No. 13/871,762, filed on Apr. 26, 2013, now Pat. No. 8,904,429.

(30) Foreign Application Priority Data

May 17, 2012 (KR) ........................ 10-2012-0052590

(51) Int. Cl.
*H04N 5/445* (2011.01)
*H04N 21/472* (2011.01)
(Continued)

(52) U.S. Cl.
CPC ......... *H04N 21/472* (2013.01); *H04N 21/254* (2013.01); *H04N 21/25841* (2013.01);
(Continued)

(58) Field of Classification Search
CPC ......... H04N 21/4524; H04N 21/25841; H04N 21/482
(Continued)

(56) References Cited

U.S. PATENT DOCUMENTS 6,177,931 B1 * 1/2001 Alexander ......... G06Q 30/0269
348/565
6,774,926 B1 8/2004 Ellis et al.
(Continued)

FOREIGN PATENT DOCUMENTS

CN 1244990 A 2/2000
CN 1353558 A 6/2002
(Continued)

*Primary Examiner* — James R Sheleheda
(74) *Attorney, Agent, or Firm* — Birch, Stewart, Kolasch & Birch, LLP

(57) ABSTRACT

A method of providing information about a service provider by using an electronic device displaying contents is described. Information corresponding to first service providers which are able to provide a service to a specific electronic device regardless of a location of the specific electronic device is displayed. The information corresponding to the first service providers is displayed enabled. Information corresponding to second service providers which are able to provide a service to a specific electronic device in a certain region is displayed. The information corresponding to the second service providers is displayed disabled. Regional information of the electronic device is set based on regional information received through a user interface unit or location information obtained by a location information module. The set regional information is transmitted to a server. Information about service providers related to the transmitted regional information and unrelated to the set regional information is received.

18 Claims, 32 Drawing Sheets

(51) Int. Cl.
*H04N 21/482* (2011.01)
*H04N 21/258* (2011.01)
*H04N 21/45* (2011.01)
*H04N 21/431* (2011.01)
*H04N 21/254* (2011.01)
*H04N 21/2665* (2011.01)
*H04N 21/462* (2011.01)

(52) U.S. Cl.
CPC ..... *H04N 21/2665* (2013.01); *H04N 21/4314* (2013.01); *H04N 21/4524* (2013.01); *H04N 21/4622* (2013.01); *H04N 21/47211* (2013.01); *H04N 21/482* (2013.01)

(58) Field of Classification Search
USPC .................................. 725/35, 44, 46, 48
See application file for complete search history.

(56) References Cited

U.S. PATENT DOCUMENTS

| | | | |
|---|---|---|---|
| 6,813,501 | B2 | 11/2004 | Kinnunen et al. |
| 7,412,400 | B1 | 8/2008 | Bhela et al. |
| 8,904,429 | B2* | 12/2014 | Kim ................ H04N 21/472 725/35 |
| 2001/0018349 | A1 | 8/2001 | Kinnunen et al. |
| 2002/0072379 | A1 | 6/2002 | Chen et al. |
| 2004/0168184 | A1* | 8/2004 | Steenkamp ........... H04N 7/163 725/31 |
| 2006/0136310 | A1 | 6/2006 | Gonen et al. |
| 2008/0022298 | A1 | 1/2008 | Cavicchia |
| 2008/0320562 | A1* | 12/2008 | Creamer ............. G06Q 30/02 726/3 |
| 2010/0175091 | A1 | 7/2010 | Revell et al. |
| 2010/0311399 | A1* | 12/2010 | Cusick ............... H04N 5/44543 455/414.2 |
| 2011/0171941 | A1 | 7/2011 | Cusick et al. |
| 2011/0179453 | A1* | 7/2011 | Poniatowski ......... G06F 3/0482 725/58 |
| 2011/0219395 | A1* | 9/2011 | Moshiri ............... G11B 27/034 725/30 |
| 2013/0152130 | A1* | 6/2013 | Stallings ............. H04N 5/4403 725/41 |
| 2014/0047488 | A1* | 2/2014 | Kunisetty ........ H04N 21/25841 725/93 |
| 2014/0128040 | A1* | 5/2014 | Guglielmo ............ H04W 4/16 455/414.1 |
| 2015/0181261 | A1* | 6/2015 | Kiok ............... H04N 21/23109 725/41 |
| 2016/0029095 | A1* | 1/2016 | Poniatowski ......... G06F 3/0482 725/58 |

FOREIGN PATENT DOCUMENTS

| | | | | |
|---|---|---|---|---|
| CN | 1779707 A | 5/2006 | | |
| CN | 101084684 A | 12/2007 | | |
| CN | 101166305 A | 4/2008 | | |
| CN | 101558647 A | 10/2009 | | |
| CN | 102056017 A | 5/2011 | | |
| EP | 1 130 933 A1 | 9/2001 | | |
| FI | EP 1130933 A1 * | 9/2001 | ............. | H04W 4/02 |
| NO | WO 0205586 A1 * | 1/2002 | ............. | H04L 29/06 |
| WO | WO 98/26584 A1 | 6/1998 | | |
| WO | WO 02/05586 A1 | 1/2002 | | |
| WO | WO 2004051453 A1 * | 6/2004 | ............. | H04N 7/163 |

* cited by examiner

FIG. 23

| S1 | Select Language |
|---|---|
| S2 | Select Use Conditions |
| S3 | Select Country |
| S4 | Set Password |
| S5 | Set Timezone |
| S6 | Set Auto Power Save Mode |
| S7 | Connect Network |
| S8 | Set Regional Information |
| S9 | Set Auto Channel |
| S10 | Set Universal Remote Controller |
| S11 | Complete Settings |

FIG. 27

ELECTRONIC DEVICE AND METHOD FOR INFORMATION ABOUT SERVICE PROVIDER

CROSS-REFERENCE TO RELATED APPLICATIONS

This application is a continuation of co-pending U.S. patent application Ser. No. 13/871,762 filed on Apr. 26, 2013, which claims priority under 35 U.S.C. §119(a) to Patent Application No. 10-2012-0052590 filed in Korea on May 17, 2012, all of which are hereby expressly incorporated by reference into the present application.

BACKGROUND

Field of the Invention

The present invention relates to a method of providing information about a service provider and electronic device, and more particularly, a method of receiving information about a service provider providing services and providing information about a service provider and electronic device providing the received information to a user.

Background Art

A broadcast receiver is, for example, a device equipped with a function that receives and processes broadcast images that the user can view. The broadcast receiver, for example, displays one of the outputting broadcasts from a broadcast station, which is selected by the user. It is a worldwide trend that worldwide current broadcasts are being converted from analog broadcast to digital broadcast.

In addition, the broadcast receiver not only processes and displays broadcast signals received by satellite or cable but also is connected to external devices such as a video cassette recorder (VCR), digital versatile disk (DVD) player, personal computer (PC), and set top box (STB) and processes and displays audio or video provided from the external devices. Also, a recent display device is connected to a service provider through network and processes and receives various data or contents provided by the service provider.

Accordingly, the broadcast receiver receives information about a service provider that can be connected through network and the information provided to the user is as important as electronic program guide (EPG) information about live programs provided to the user.

SUMMARY OF THE INVENTION

A technical goal of the present invention is to provide a method of providing information about service providers and electronic devices that can provide information about the service providers based on region in which the electronic device is installed or regional information set by the user.

Another technical goal of the present invention is to provide a method of providing information about electronic providers and service providers that can provide information about service providers such that the user can easily select a service provider that the user wants.

Another technical goal of the present invention is to provide a method of providing information about electronic devices and service providers such that the user can easily confirm and conveniently approach services provided by service providers that the user has subscribed to.

The method of providing information about service providers according to the present invention for achieving the technical goals includes setting regional information of the electronic device based on regional information received through a user interface unit or location information obtained by a location information module, transmitting the set regional information to a server, receiving information about a service provider related to the transmitted regional information from the server, and displaying the received information about the service provider.

The displaying the received information about the service provider comprises enabling a first graphic object indicating the service provider related to the regional information of the electronic device, and disabling a second graphic object indicating a service provider unrelated to the regional information of the electronic device.

The method of providing information about the service providers further includes sensing a user action selecting the enabled first graphic object, and providing, in response to the user action, a display page for subscribing to services provided by the service provider related to the selected first graphic object.

The method of providing information about the service providers further includes sensing a user action selecting the enabled first graphic object, and displaying, in response to the user action, a Pay TV Exclusive Card Object displaying services provided by the service provider related to the selected first graphic object.

Displaying, in response to the user action, the Pay TV Exclusive Card Object comprises displaying a button for changing the Pay TV Exclusive Card Object.

The method of providing information about the service providers further includes sensing a first user action selecting the button, displaying a list listing subscribed service providers in response to the first user action, sensing a second user action selecting one of the listed service providers, and displaying, in response to the second user action, a Pay TV Exclusive Card Object displaying a service provided by the selected service provider.

The received information about the service provider can be displayed on a Pay TV Card Object. Displaying the received information about the service provider comprises moving the Pay TV Card Object to a first display page of a homepage.

Setting regional information includes displaying a Pay TV Card Object including one or more graphic objects indicating a service provider, sensing a user action selecting one of the graphic objects, displaying the user interface unit in response to the user action, and receiving information through the displayed user interface unit.

The displayed Pay TV Card Object includes a graphic object indicating a service provider providing all regions service and the graphic object is enabled.

The displayed Pay TV Card Object includes information or a graphic indicator indicating a service provider providing pre-subscribed services.

The received information about the service provider includes at least one of an identifier identifying service providers, names of service providers, addresses for connecting to service providers, type information of service providers, information about a region which service providers provide services to, and charging information of service providers.

The service provider related to the transmitted regional information includes a service provider providing services to an electric device installed in a region which the transmitted regional information indicates.

The service provider related to the transmitted regional information is a service provider providing a pay service.

For achieving the technical goals, an electronic device for displaying contents includes a controller setting regional information of the electronic device based on regional information received through a user interface unit or location information obtained by a location information module, a network interface transmitting the set regional information to a server, and receiving information about a service provider related to the transmitted regional information from the server, and a display displaying the received information about the service provider.

The method of providing information about an electronic device and service provider according to the present invention can provide information about service providers based on region in which the electronic device is installed or regional information set by the user because information about service providers related to the set regional information is received and provided; enables the user to easily select a service provider that the user wants because an icon enabling to select a service provider from which a service can be obtained is displayed; enables the user to easily confirm and conveniently approach services provided by pre-subscribed service providers through exclusive space because the exclusive space about the pre-subscribed service providers is provided.

BRIEF DESCRIPTION OF THE DRAWINGS

FIG. 23 is a drawing illustrating an embodiment of the executing process of Setup Wizard;

FIG. 27 is a drawing illustrating another embodiment of information change displayed in the graphic user interface during the regional information setting process;

DETAILED DESCRIPTION OF THE INVENTION

The present invention will be described in detail in reference with the drawings hereinafter.

Suffixes "module" and "unit" of components used in the following description are given merely for the convenience of explanation. The "module" and "unit" may be used interchangeably.

Meanwhile, an electronic device described in this specification is an intelligent electronic device having a computer supporting function as well as a broadcast receiving function. As an Internet function is added to the electronic device in addition to a broadcast receiving function, the electronic device may include an interface which can be more conveniently used than a writing type input device, a touchscreen, a touchpad, or a space remote controller. And, the electronic device may be connected to Internet or a computer under the support of a wired or wireless Internet function so that emailing, web browsing, banking, and gaming functions can be performed. For such various functions, a standardized general-purpose operating system (OS) may be used.

Accordingly, in the electronic device according to the present invention, as various applications may be freely added or removed, for example, in a general-purpose OS kernel, it is possible to perform various user-friendly functions. More specifically, examples of the electronic device may include a network TV, hybrid broadcast broadband television (HBBTV), smart TV, and open hybrid TV (OHTV). According to the circumstances, the present invention may be applied to a smart phone, a personal computer (PC), and an electric home appliances.

Furthermore, although embodiments of the present invention will be described in detail with reference to the accompanying drawings and content of the drawings, the present invention is not limited or restricted only by such embodiments.

Although most terms of elements in this specification have been selected from general ones widely used in the art taking into consideration functions thereof in this specification, the terms may be changed depending on the intention or convention of those skilled in the art or the introduction of new technology. Also, some terms have been arbitrarily selected by the applicant and their meanings are explained in the following description as needed. Thus, the terms used in this specification should be construed based on the overall content of this specification together with the actual meanings of the terms rather than their simple names or meanings.

Figure 1:
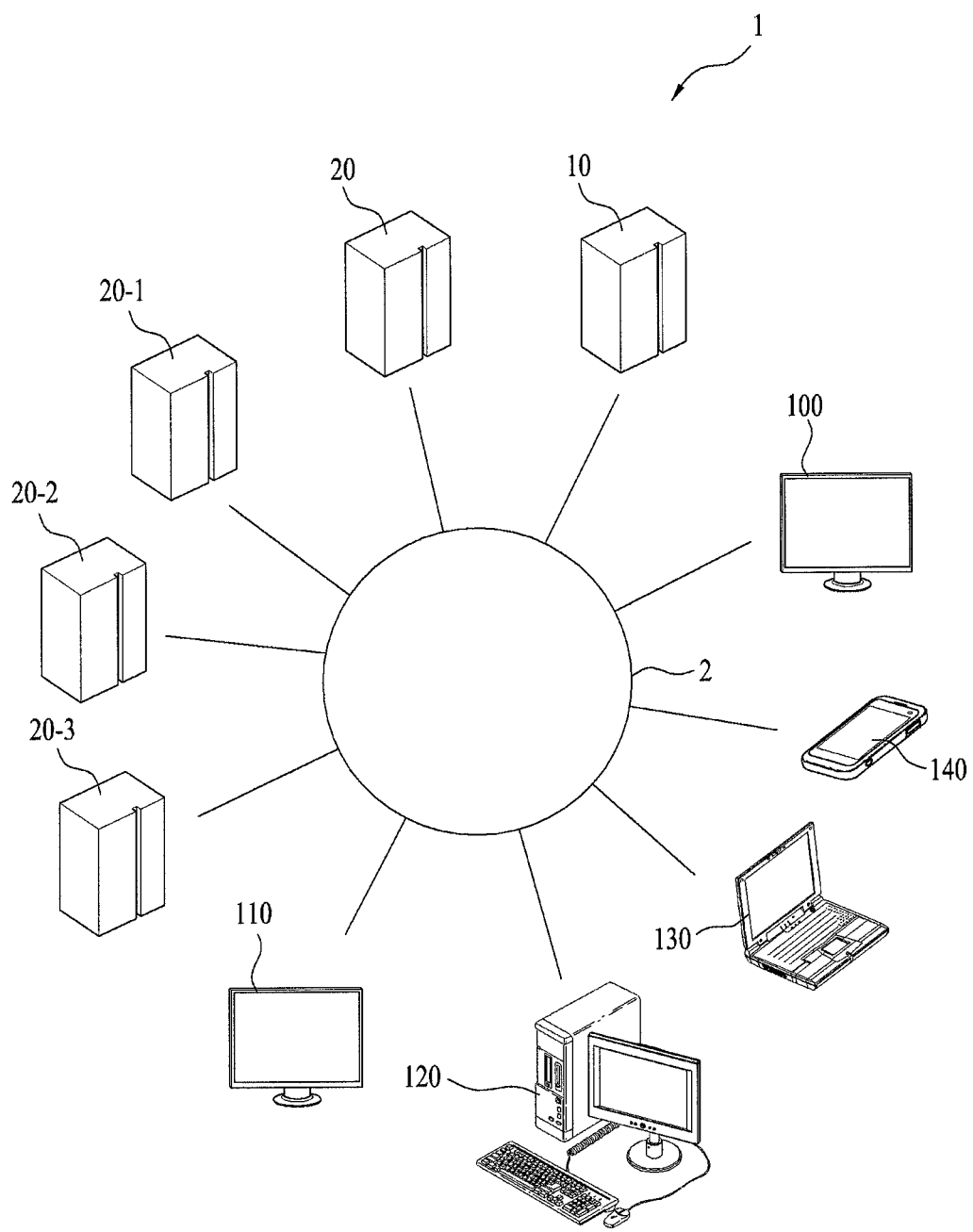
FIG. 1 is a block diagram briefly illustrating an embodiment of a broadcast system according to the present invention.

FIG. 1 is a block diagram briefly illustrating an appropriate embodiment of a broadcast system according to the present invention.

Referring to FIG. 1, the broadcast system (1) according to the present invention may include a first server (10), second server (20, 20-1, 20-2, 20-3), first digital TV (100), second digital TV (110), personal computer system (120), labtop (130) laptop (130), and mobile communications device (140). Also, the first server (10), second sever (20, 20-1, 20-2, 20-3), first digital TV (100), second digital TV (110), personal computer system (120), labtop (130), and mobile communications device (140) may be connected to network (2).

The network (2) may be composed of a backbone network and subscriber network. The backbone network may be composed of one or a plurality of X.25, Frame Relay, ATM, Multi Protocol Label Switching (MPLS) and Generalized Multi Protocol Label Switching networks. The subscriber network may be Fiber To The Home (FTTH), Asymmetric Digital Subscriber Line (ADSL), cable, Wireless Lan (IEEE 802.11b, IEEE 802.11a, IEEE802.11g, IEEE802.11n), Wireless Broadband (WIBro), Wimax and High Speed Downlink Packet Access (HSDPA) networks. As an embodiment, the network (2) may be internet or mobile communications network.

The first server (10) may provide services for connecting among the second server (20, 20-1, 20-2, 20-3), first digital TV (100), second digital TV (110), personal computer system (120), labtop (130) laptop (130), and mobile communications device (140).

Also the first server (10) stores, manages, and provides information about service providers. The information about the service providers includes at least one of a service provider identifier, service provider name, type information, address information, and charging information.

The service provider identifier indicates an identifier or identifier information to identify between a service provider and another service provider.

The service provider name indicates the name of service provider.

The type information means information indicating whether the service provided by the service provider is an all regions service or regional service. The all regions service means a service providing electronic devices installed in all regions regardless of the locations of the electronic devices, and the regional service means a service that can be provided to electronic devices installed in certain regions. In the following, service providers providing all regions service will be named all regions service providers and service providers providing regional service will be named regional service providers.

The address information is information for connecting the electronic device to the service provider. The address information may include at least one of Media Access Control (MAC), Internet Protocol (IP), port number, Domain Name System (DNS) name and Uniform Resource Locator (URL) address.

The charging information may include at least one of information about the service charge and information about whether the service is a pay service.

The first server (10) may receive a regional service information request message requesting for the service provider information with an electronic device that includes regional information. In response to the receipt of the regional service information request message, the first server (10) provides to the electronic device information about the service provider related to regional information including the regional service information request message. The service provider related to the regional information may indicate a service provider providing services to an electronic device installed in a region that the regional information indicates. Also, the service provider related to regional information may be a regional provider except all regions service providers. Region indicated by the regional service information may be a country and an administrative district. Also, the regional information may include at least one of a country name and administrative district name and may include at least one of a country allocated code or symbol, and a code or symbol allocated to administrative district. As an embodiment, regional information can be a zip code.

As an embodiment, region indicated by the regional information may be a virtual region. The virtual region means a virtual region, not a real region, or a region specified by a code. The regional service provider provides services to an electronic device installed in the virtual region. Here, the fact that the electronic device is installed in the virtual region means that regional information set in the electronic device indicates a specified virtual area.

The second server (20, 20-1, 20-2, 20-3) provides services to the first broadcast receiver (100), second broadcast receiver (110), personal computer (120), laptop (130), and mobile communications device (140). The services provided by the second server (20, 20-1, 20-2, 20-3) may include a broadcast service and internet service. The internet service means services provided by internet such as Content's on Demand (CoD), Youtube service, information services such as weather, news, and local information, entertainment services such as game and karaoke, communications services such as TV mails, and TV Short Message Service (SMS), and application providing services.

The services provided by the second server (20, 20-1, 20-2, 20-3) may be local services or all regions services. For example, the second server (20, 20-1) may be an all regions service provider providing services to electronic devices installed in all regions.

Figure 2:
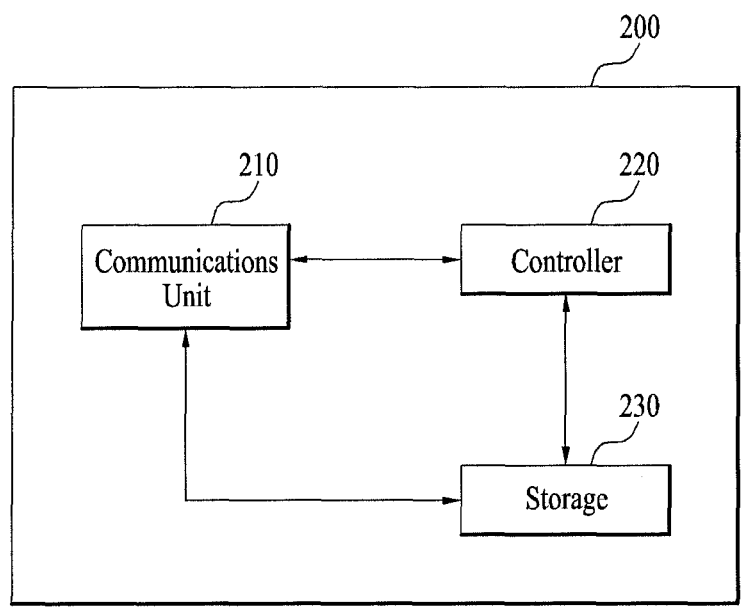
FIG. 2 is a block diagram illustrating an appropriate embodiment of a server according to the present invention.

FIG. 2 is a block diagram illustrating an appropriate embodiment about the server according to the present invention.

Referring to FIG. 2, the server (200) can execute the first server (10)'s functions, the second server's (20, 20-1, 20-2, 20-3) functions, and both the first server (10)'s and second server's (20) functions. The server (200) may include a communications unit (210), controller (220), and storage (320).

The communications unit (210) receives packets transmitted through the network (2) and transmits the packets to the personal computer (120), laptop (130), and mobile communications device (140). The packet can be transmitted to a Session Initiation Protocol (SIP), User Datagram Protocol (UDP), and Transport Control Protocol (TCP). Here, the packet may include a registration request signal, response signal, connection request signal, connection setting signal, video streaming, webpage, file and regional service information request message.

The controller (220) can control the packet transmission of the communications unit (210) based on at least one of the SIP, Simple Mail Transfer Protocol (SMTP), Hypertext Transfer Protocol (HTTP), File Transfer Protocol (FTP), Real-Time Streaming Protocol (RTSP), and Multi Media Streaming (MMS).

The controller (220), in the case that regional information is received from the electronic device, can control such that information about service providers related to the received regional information, in response to the receipt of the regional information, can be transmitted.

The storage (230) can store information about service providers.

Figure 3:
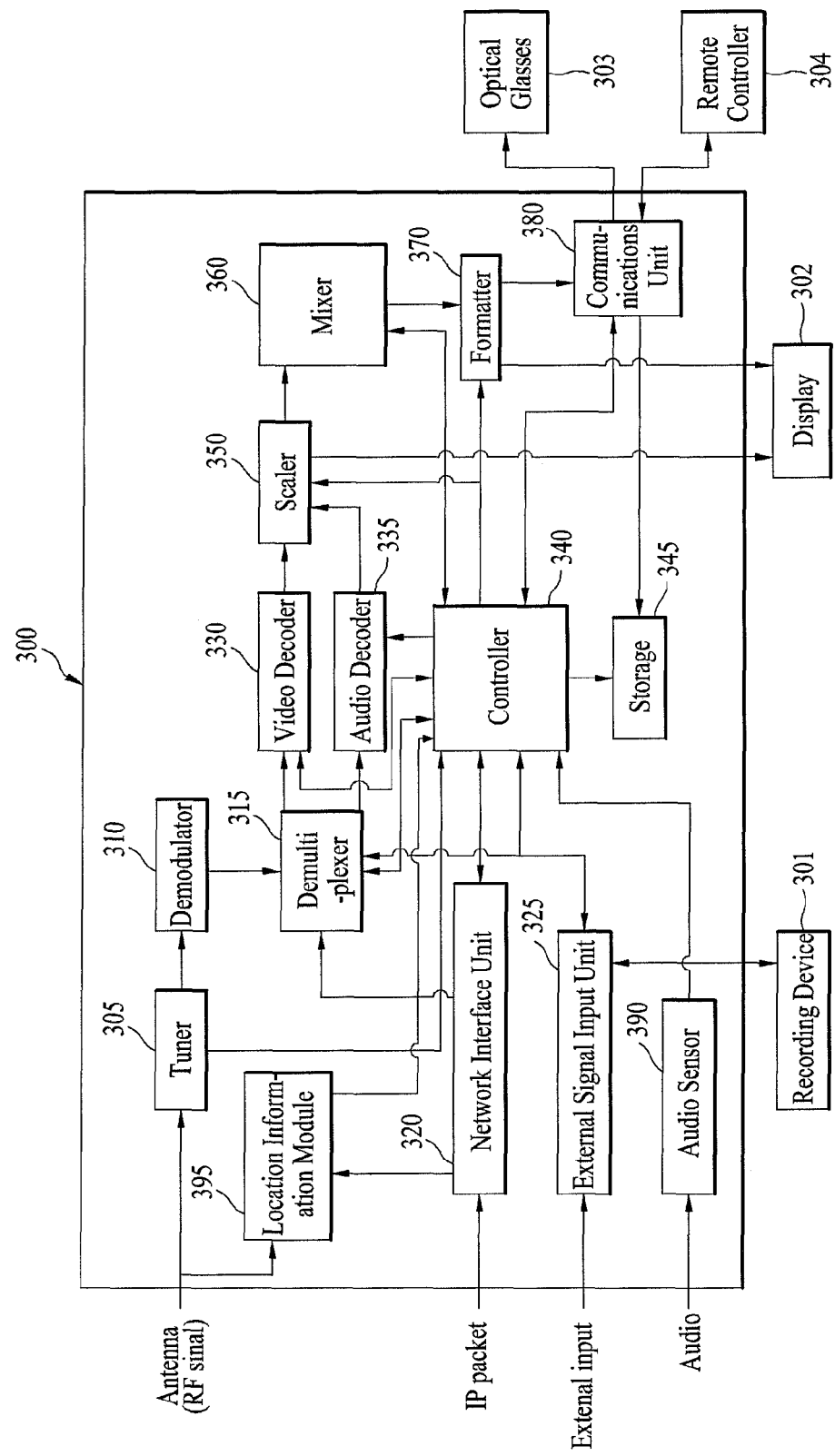
FIG. 3 is a block diagram illustrating an appropriate embodiment of an electronic device according to the present invention.

FIG. 3 is a block diagram displaying an appropriate embodiment of the electronic device according to the present invention.

Referring to FIG. 3, an electronic device (300) can execute at least one function of the first broadcast receiver (100), second broadcast receiver (110), personal computer (120), laptop (130), or mobile communications device (140).

The electronic device (300) may include a tuner (305), demodulator (310), demultiplexer (310), network interface unit (320), external signal input unit (325), video decoder (330), audio decoder (335), controller (340), storage (345), scaler (350), mixer (360), formatter (370), communications unit (380), audio sensor (390), and location information module (395). The electronic device (300) may further include a recording device (301), display (302), optical glasses (303), and remote controller (304).

The tuner (305) selects an RF (Radio Frequency) broadcast signal corresponding to the RF broadcast signal selected by the user among RF broadcast signals received through antenna and converts the selected RF broadcast signal to a mid-frequency signal, base on band video or audio signals.

The demodulator (310) receives and demodulates a digital IF signal (DIF) converted in the tuner (305).

Also, the demodulator (310) can execute channel decoding. For doing so, the demodulator (310), equipped with a Trellis Decoder, De-interleaver, and Reed Solomon Decoder, may execute Trellis decoding, de-interleaving, and Reed Solomon decoding.

The demodulator (310) may output stream signals (TS) after executing demodulation and channel decoding. Then, the stream signal can be a multiplexed video, audio or data signal.

The demultiplexer (315) receives stream signals from the demodulator (310), the network interface unit (320), and the external signal input unit (325). Also, the demultiplexer (315) demultiplexes the received stream signals to video, audio, and data signal and outputs them to the video decoder (330), audio decoder (335), and controller (340).

The video decoder (330) receives video signals from the demultiplexer (315) and restores and outputs the received video signals to the scaler (350). Here, the video signal includes dimensional signals.

The audio decoder (335) receives audio signals from the demultiplexer (315), restores the received audio signals, and outputs the restored audio to the display (302) or scaler (350).

The network interface unit (320) receives the received packets from the network (2) and transmits the packets to the network (2). The network interface unit (320) can transmit regional information to the first server (10), and receives information about service providers related to the transmitted regional information. Also, the network interface unit (320) can receive services or Pay TV Exclusive Card Objects from the second server (20, 20-1, 20-2, 20-3) through the network (2).

The network interface unit (320), in the case that IP packets include stream signals, extracts stream signals from the IP packets and outputs the signals to the demultiplexer (315). Here, the stream signals can be received from the second server (20, 20-1, 20-2, 20-3).

The network interface unit (320) can output the received data to the controller (340) or location information module (395).

The external signal input unit (325) can provide an interface and user interface that can connect the electronic device (300) and the external device. Here, the external device indicates various video or audio outputting devices such as a Digital Versatile Disk (DVD), blueray, game consoles, camcorder, and computer (laptop).

Also, the external device can be a recording device (301). The recording device (301) can include a plurality of cameras. The recording device (301) can photograph a person. The recording device (301) focuses on and zooms in the wingspan of a person's hand by sensing the wingspan of the person's hand. Here, the photographed hand posture can be sensed as a space gesture. That is, the controller (340) senses the photographed hand posture as a space gesture and executes commands for performing actions related to the sensed space gesture. Here, the space gesture can be defined as a video frame mapped by at least one of specified computing actions and received from the recording device (301) or a gesture sensed from the video.

As an embodiment, the electronic device (300) includes the recording device (301).

The external signal input unit (325) may be a touchpad or touch screen. The touch screen can be combined with the display as a whole, or can be several separate components. The touch screen can be named a touch screen display in the case that the touch screen is combined with the display (302) as a whole. The user can directly control a Graphical User Interface (GUI) displayed in the screen as the touch screen is placed in the front of the display (302). For example, the user can place the user's hand on an object to be controlled.

With regard to the touchpad, the touchpad is placed generally on a different plane away from the display (302). For example, the display (302) is generally placed on the vertical plane and the touch pad is generally placed on the horizontal plane. That is, since the user's use is less intuitive, it is difficult to compare the touchpad with the touch screen.

Also, the touchpad and touch screen can be a multi-point input device.

The controller (340) senses a touch gesture by the external signal input unit (325) and can control the electronic device (300) based on the touch gesture. Here, the touch gesture can be defined as a formatted mutual interaction, mapped to at least one or more specified computing actions, with the external signal input unit (325). The touch gesture can be performed through various hands, in more detail, finger movements. As an alternative or in addition, the touch gesture can be performed by a stylus. Here, entities causing the touch gesture such as a hand and stylus are named "Object".

The external signal input unit (325) receives the touch gesture and the controller (340) executes commands for performing actions related to the touch gesture. Furthermore, the storage (345) can include an operating system or gesture operation program which may be a part of a separate application. The gesture operation program senses occurrences of gestures (touch gestures or space gestures) in general and includes commands informing at least one software agent of actions to be taken in response to those gestures.

When the user performs more than one gesture, the external signal input unit (325) transmits gesture information to the controller (340). By using commands from the storage (345), in more detail gesture action programs, the controller (340) interprets touch gestures and controls different components of the electronic device (300) such as the display (302), demultiplexer (315), network interface unit (320), external signal input unit (325), storage (345), scaler (350), mixer (360), formatter (370) and audio sensor (390). The gesture executes actions of the applications stored in the storage (345), modifies GUI objects appeared in the display (302), modifies the stored data in the storage (345) and can identify it as commands executing actions in the demultiplexer (315), network interface unit (320), scaler (350), mixer (360), and formatter (370). For example, those commands can be related to zooming-in, penning, scrolling, turning pages, rotating, resizing, changing video channels, receiving contents, and connecting internet.

As an additional example, the commands can be related to designating channel numbers, selecting displayed objects, dragging displayed objects, dropping displayed objects, converting channels, displaying channel maps, converting displayed channel maps, transmitting channel viewing request signals, operating specified programs, requesting specified GUIs, opening files or documents, viewing menu, selecting, executing commands, logging on internet site systems, permitting access to restricted area of the computer system to authorized individuals, loading user profiles related to the user preference arrangement of desktop, and/or etc. Here, the displayed objects can include card objects, images, channels listed in the channel map, selected areas of GUI, menu items, and displayed contents. The card object means a group of graphic objects and the graphic cards included in the card objects move according to the card objects.

The controller (340) executes commands and performs actions related to the electronic device (300). For example, by using commands detected from the storage (345), the controller (340) can control inputs and outputs between components of the electronic device (300) and receiving and processing data. The controller (340) can be realized by a single chip, a plurality of chips, or a plurality of electric parts. For example, many various architectures such as exclusive or embedded processors, single-purpose processors, controllers, ASIC, and etc can be used for the controller (340). Also, the controller (340) includes at least one process.

The controller (340) senses user actions and can control the electronic device (300) based on the sensed user actions. The user action may include selecting a physical button of the remote controller or display device, moving the remote controller, performing a pre-set touch screen on the touch screen display or performing a pre-set space gesture sensed from video recorded by the recording device, and performing a pre-set audio sensed by audio-sensing of the audio received from the audio sensor (390). The controller (340) can be interpreted as at least one command for executing the user action. In response to at least one interpreted command, the controller (340) can control the components of the electronic device (300). That is, the controller (340) uses at least one of the commands, and can control inputs and outputs between the components of the electronic device (300) and the receipt and process of data.

By using at least one of an IP address and port number included in packets received from the network interface unit (320), the controller (340) can perform routing for the packets. That is, the controller (340) can control such that packets having specified ports can be outputted to the demultiplexer (315) and stored in the storage (345). Also, the controller (340) directly processes data including the packets and can control such that the processed outcome can be displayed on screen. That is, the controller (340) can control such that the processed outcome can be displayed on the graphic object included in the specified card object.

The controller (340) extracts data included in the packet and can perform routing for the extracted data by using at least one of the IP address and port number included in the packet. That is, the controller (340) can control such that data included in the specified port can be outputted to the demultiplexer (315) and stored in the storage (345). Also, the controller (340) directly processes data included in the packet and can control such that the processed outcome can be displayed on screen. That is, the controller (340) can control such that the processed outcome can be displayed in the graphic object included in the displayed specified card object.

The controller (340) executes computer codes with an operating system, generates and operates data. The operating system is in general publicized and will not be further described. For example, the operating system can be Windows OS, Unix, Linux, Palm OS, DOS, Android, and Macintosh. The operating system, computer code and data can exist in the storage (345) operating connected to the controller (340).

The storage (345) generally provides storage for data and program codes used by the electronic device (300). For example, the storage (345) can be realized by a ROM, Random Access Memory (RAM), hard disk drive. The program code and data can exist in a detachable storage entity, or, if needed, they can be loaded or installed in the electronic device (300). Here, the detachable storage entity includes a CD-ROM, PC-CARD, memory card, floppy disk, magnetic tape, and network component.

The storage (345) can store a service provider list. The service provider list includes information about service providers. Here, the service provider list includes information about all service providers. All the service providers mean all service providers stored in the first server (10). The service provider list can be stored when generated, and can be received from the first server (10) when setting initial condition variables of the electronic device (300). Also, the service provider list can be received from the first server (10) when upgrading software of the electronic device (300).

Also, storage (345) can store information about pre-subscribed service providers and store authorization information about the pre-subscribed service providers.

The scaler (350) displays signals processed in the video decoder (330) or audio decoder (335) or scales signals to an appropriate magnitude for outputting through speakers (not shown).

Also, the scaler (350) outputs a GUI, video, aspect ratio of dimensional images, and at least two of the aforementioned combined according to the type of contents or user setting. The aspect ratio variable may be 21:9, 16:9, 4:3 or 3:2 and the scaler (350) can adjust the width and length of the screen to a specified ratio.

The mixer (360) outputs by mixing outputs of the scaler (350) and the controller (340).

The formatter (370) converts audio and video signals outputted from the mixer (360) into the outputting format of the display (302). Here, the formatter (370) pass the inputted signals without the converting if two Dimensional images are being displayed. And, in the case of displaying dimensional images, the formatter (370) can process as a 3D formatter in the three dimensional format applicable to the output frequency of the display (302) and the format of the dimensional images according to the control of the controller (340).

Also, the formatter (370) outputs the converted audio signals to the display (302) in order to realize dimensional images and outputs to the communications unit (380) by generating Sync signals of the outputted dimensional images signals. Here, the Sync signals are signals to synchronize the opening and closing timing of the left view or right view lenses of the shutter glasses and the display timing of the left view or right view images according to the 3D images signals.

The communications unit (380) is a communications module providing bi-direction of omnidirectional (or non-directional) communications means and performs wireless communications with other communications devices by communications means according to the pre-determined communications standards. Here, the communications standards can be Zigbee, Bluetooth, Ultra Wideband (UWB), Radio Frequency Identification (RFID) and Wireless Land, and the communications device can be the electronic device (300), optical glasses (303), and remote controller (304).

The communications unit (380) can include an infrared receiver receiving infrared rays from the remote controller (304).

The audio sensor (390) receives audio and outputs the received audio to the controller (340). The controller (340) senses the outputted audio and can control the electronic device (300) based on the sensed audio.

The location information module (395) is a module to obtain the location of the electronic device (300) and its best example is a Global Position System (GPS) module. The location information module (395) can obtain the location of the electronic device (300) based on the outputted data from the network interface unit (320). The controller (340) can set the regional information of the electronic device (300) based on the location information obtained by the location information module (395).

Figure 4:
FIG. 4 is a drawing illustrating an embodiment of a list including information about service providers related to regional information.

FIG. 4 is a drawing illustrating an embodiment of a list including information about service providers related to regional information.

Referring to FIG. 4, in response to the receipt of the transmitted regional information of the electronic device (300), the first server (10) can transmit a list (400) to the electronic device (300).

The list (400) includes information about service providers related to the regional information transmitted by the electronic device (300) and information about service providers unrelated to the regional information transmitted by the electronic device (300). In the list (400), C, D, and H that are checked among service providers A, B, C, D, E, F, G, and H are the service providers related to the transmitted regional information. That is, C, D, and H are regional service providers providing regional services to region in which the electronic device (300) is installed. A and B are all regions service providers. And, E, F, and G are service providers that do not provide regional services to region in which the electronic device (300) is installed. That is, E, F, and G are service providers unrelated to regional information transmitted by the electronic device (300).

Figure 5:
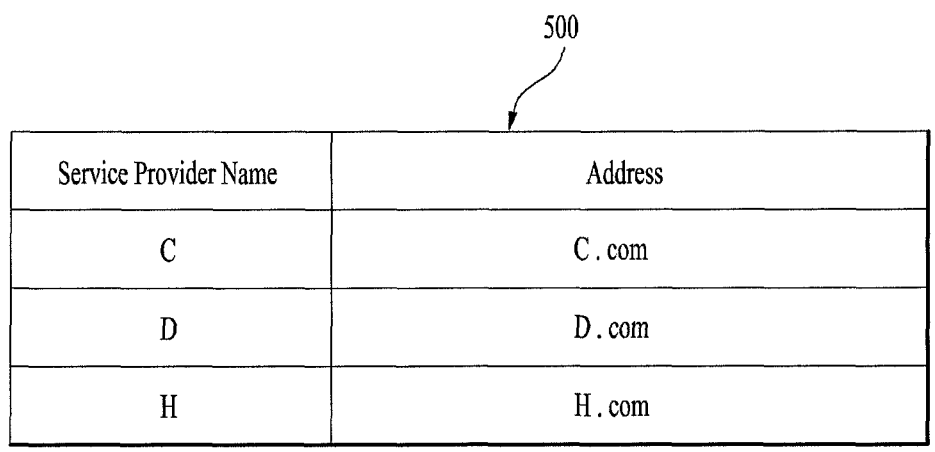
FIG. 5 is a drawing illustrating another embodiment of a list including information about service providers related to regional information.

FIG. 5 is a drawing illustrating another embodiment of a list including information about service providers related to regional information.

Referring to FIG. 5, in response to the receipt of the regional information transmitted by the electronic device (300), the first server (10) can transmit a list (500) to the electronic device (300). The list (500) includes information about service providers related to regional information transmitted by the electronic device (300). Unlike the list (400) shown in FIG. 4, the list (500) does not include information about service providers unrelated to regional information transmitted by the electronic device (300).

Figure 6:
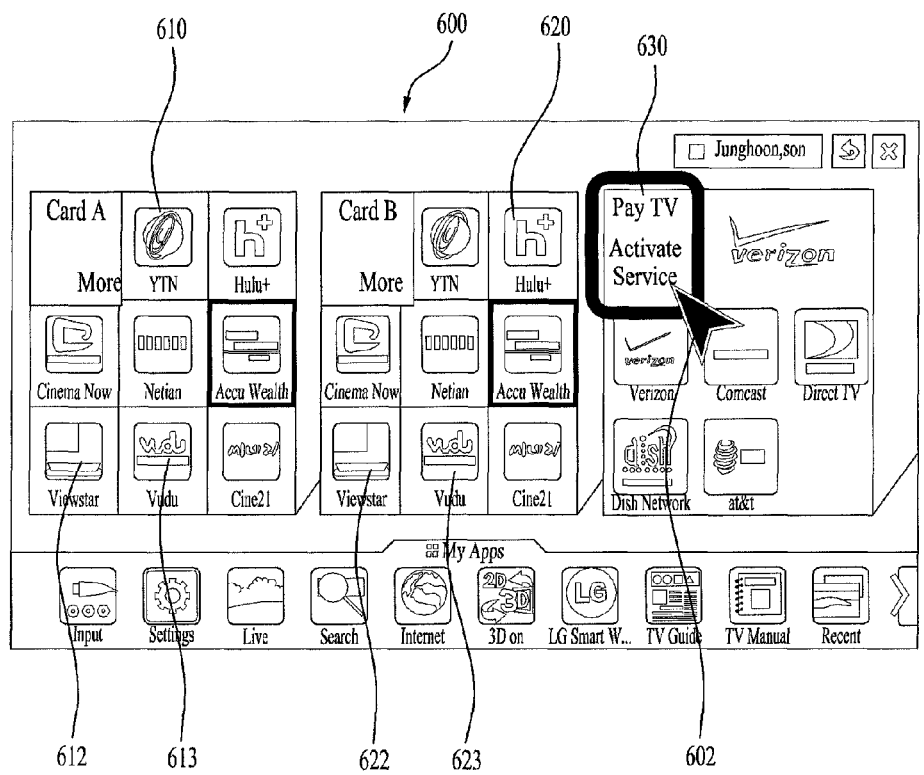
FIG. 6 is a drawing illustrating an embodiment of a screen displaying a display page including card objects.

FIG. 6 is a drawing illustrating an embodiment of a screen displaying a display page including card objects.

Referring to FIG. 6, the display (302) can display a screen (600). The screen (600) displays a display page including card objects (610, 620, 630). The card object (610) and the card object (620) include a plurality of graphic objects (612, 613, 622, 623) indicating contents providers. The card object (630) is a Pay TV Card Object.

The card objects (610, 620, 630) can drag and drop according to the movements of a pointer (602). Also, the card objects (610, 620, 630) can move to other display pages. Also, the card objects (610, 620, 630) can be deleted. Also, a new card object can be generated or inserted in the display page (600), and in the case of generating a new card object, one of the card objects (610, 620, 630) can automatically move to a different display page.

Figure 7:
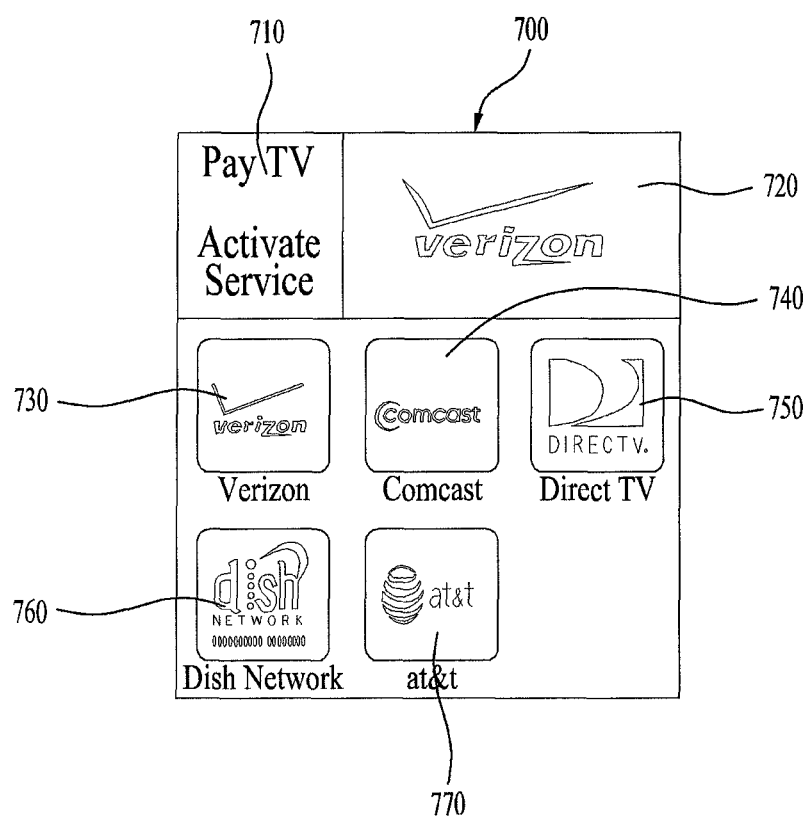
FIG. 7 is a drawing illustrating an embodiment of a Pay TV Card Object.

FIG. 7 is a drawing illustrating an embodiment of a Pay TV Card Object.

Referring to FIG. 7, a Pay TV card object (700) is an embodiment of a Pay TV Card Object to be displayed before setting regional information about the electronic device (300). Pay TV Card Object (700) includes a graphic object (710) indicating the Pay TV Card, a graphic object (720) displaying commercials, and graphic objects (730, 740, 750, 760, 770) indicating the service provider. And graphic objects (730, 740, 750, 760, 770) are displayed disabled.

The service provider indicated by the graphic objects (730, 740, 750, 760, 770) may be service providers listed in the service provider list stored in the storage (345). The Pay TV Card Object (700) can display all or some of the service providers listed in the service provider list stored in the storage (345). The service providers indicated by the graphic objects (730, 740, 770) are regional service providers and the service providers indicated by the graphic objects (750, 760) are all regions service providers.

Figure 8:
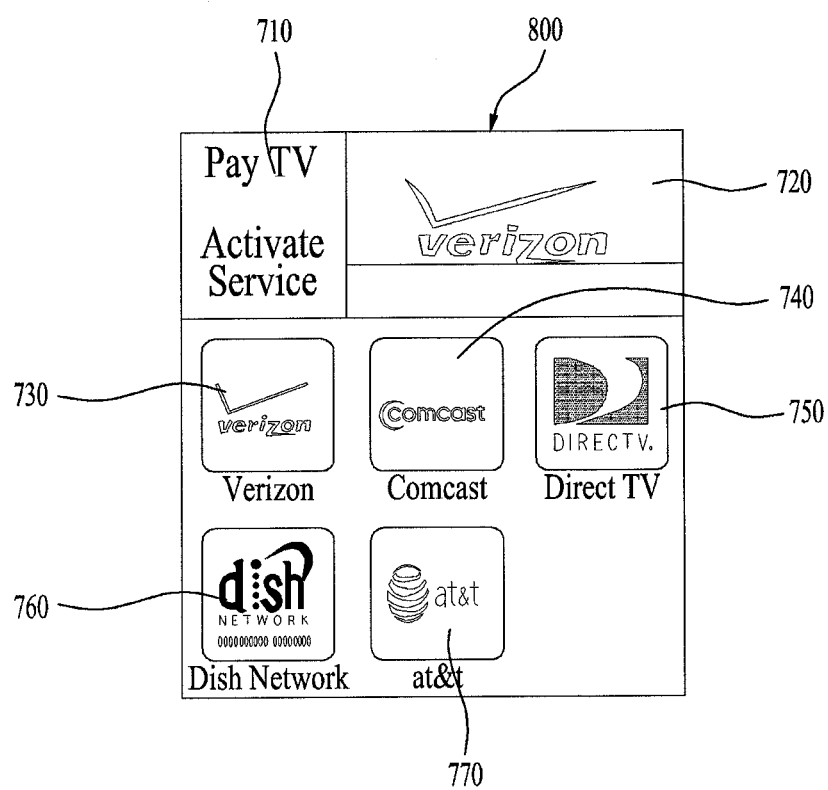
FIG. 8 is a drawing illustrating another embodiment of a Pay TV Card Object.

FIG. 8 is a drawing illustrating another embodiment of the Pay TV Card Object.

Referring to FIG. 8, a Pay TV Card Object (800) is an embodiment of the Pay TV Card Object which is displayed prior to setting regional information in the electronic device (300).

The graphic objects (750, 760) indicating all regions service providers in the Pay TV Card Object (800) are displayed enabled and the graphic objects (730, 740, 770) indicating regional service providers are displayed disabled. Enabling means that the graphic object can be selected and disabling means that the graphic object cannot be selected. According to an embodiment, the disabled graphic objects can be displayed in light and shade without color and the enabled graphic objects can be displayed in color. Also, the disabled graphic object can be displayed blurred compared to the enabled one.

Figure 9:
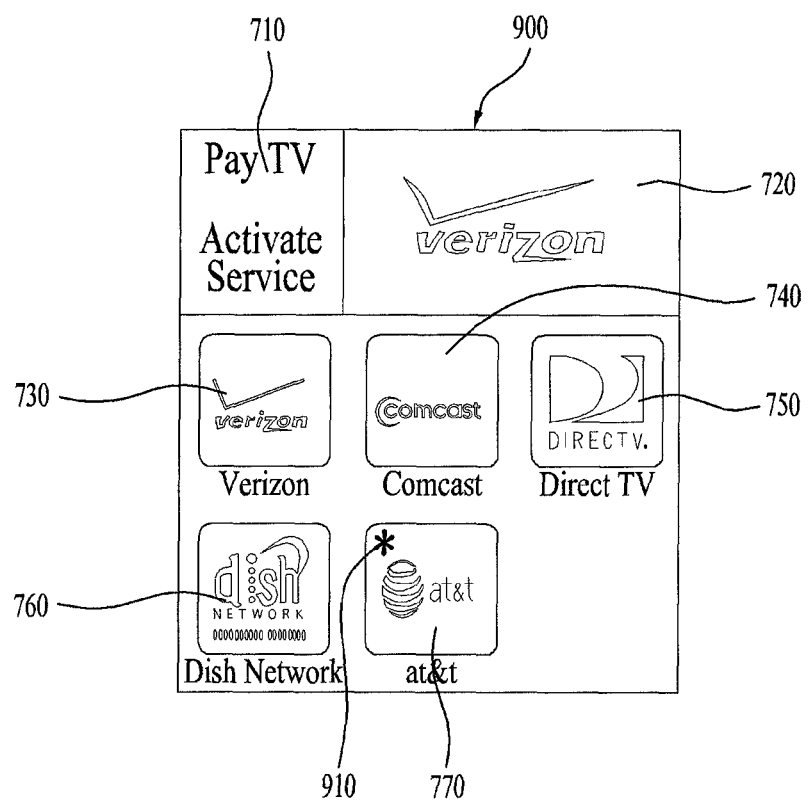
FIG. 9 is a drawing illustrating another embodiment of a Pay TV card Object.

FIG. 9 is a drawing illustrating another embodiment of a Pay TV Card Object.

Referring to FIG. 9, a Pay TV Card Object (900) is an embodiment of a Pay TV Card Object to be displayed prior to setting regional information in the electronic device (300).

The Pay TV Card Object (900) includes a graphic indicator (910) indicating a service provider providing the pre-subscribed service. The service provider indicated by the graphic object (770) in which the graphic indicator is located means a service provider providing the pre-subscribed service. As an embodiment, the Pay TV Card Object (900) can include information indicating the service provider providing the pre-subscribed service instead of the graphic indicator (920).

The controller (340) can check a service provider providing the pre-subscribed service by using the service provider list stored in the storage (345) and by using authorization information about the pre-subscribed service provider stored in the storage (345).

Figure 10:
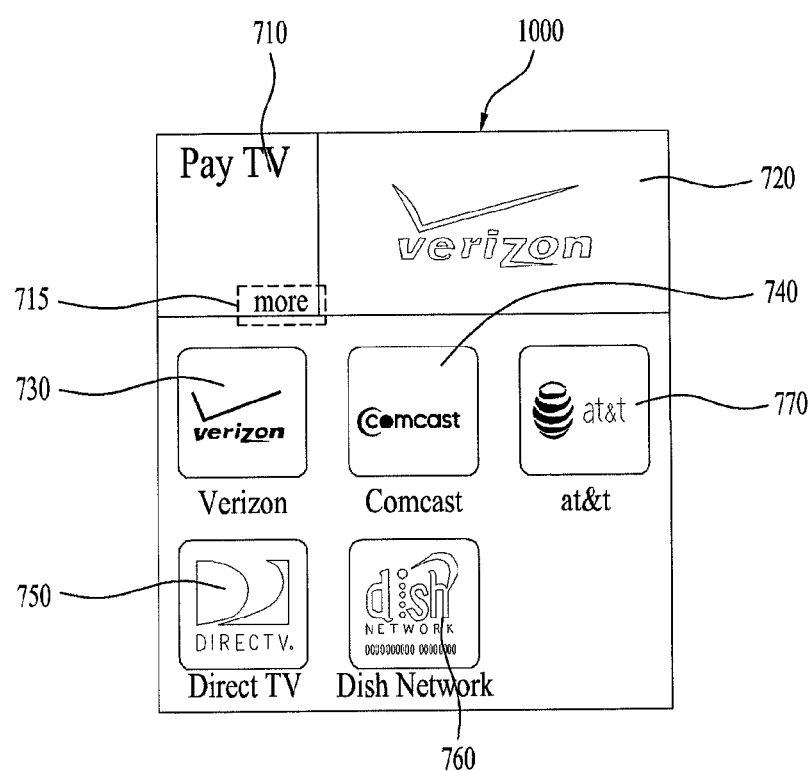
FIG. 10 is a drawing illustrating another embodiment of a Pay TV card Object.

FIG. 10 is a drawing illustrating another embodiment of a Pay TV Card Object.

Referring to FIG. 10, a Pay TV Card Object (1000) is an embodiment of a Pay TV Card Object to be displayed after setting regional information to the electronic device (300). The Pay TV Card Object (1000) displays information about service providers related to regional information.

The Pay TV Card Object (1000) includes a More button (715). The More button (715) is to request for displaying a Pay TV Display Page.

In the Pay TV Card Object (1000), the graphic objects (730, 740, 770) indicating service providers related to regional information set in the electronic device (300) are displayed enabled and the graphic objects (750, 760) indicating service providers unrelated to the regional information are displayed disabled.

As an embodiment, the graphic object (770) indicating service providers related to regional information can be moved so that it can be displayed before the disabled graphic objects (750, 760). The graphic object (770) located in the back in the Pay TV Card Object (700) shown in FIG. 7 but the graphic object (770) is located before the graphic object (750) in the Pay TV Card Object (1000).

Figure 11:
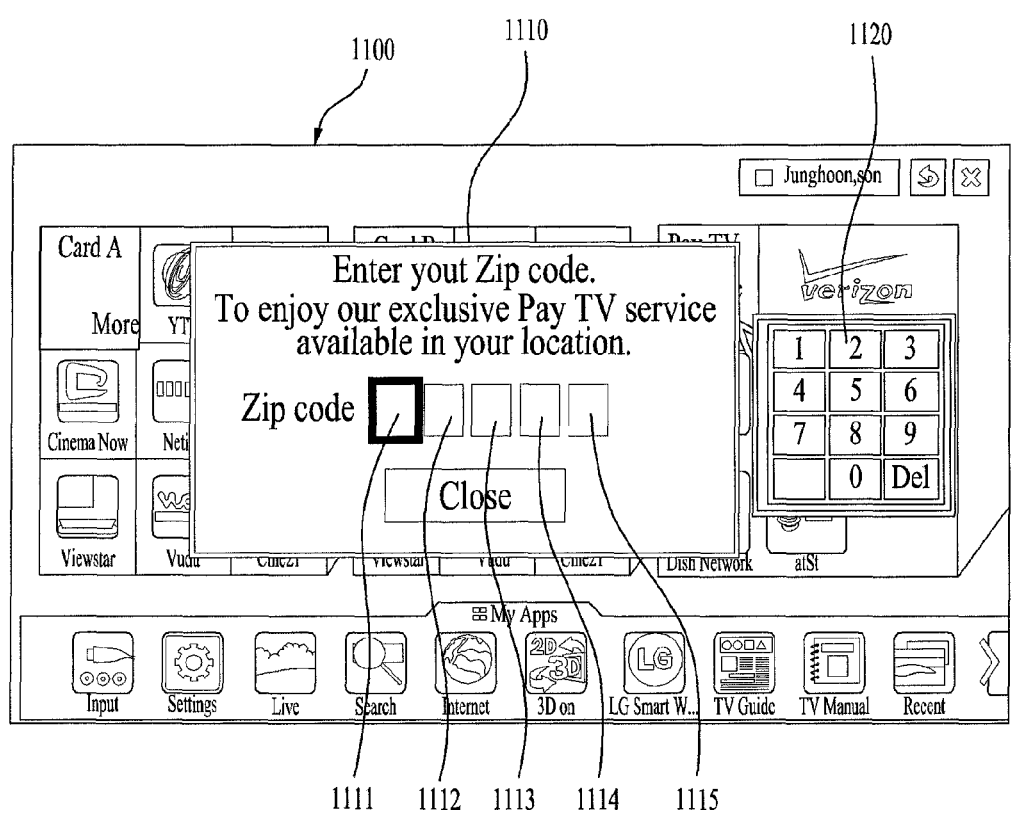
FIG. 11 is a drawing illustrating an embodiment of a screen displaying a graphic user interface for inputting regional information.

FIG. 11 is a drawing illustrating an embodiment of a screen displaying a graphic user interface for inputting regional information.

Referring to FIG. 11, the display (302) can display a screen (1100). Graphic user interfaces (1110, 1120) for inputting regional information are displayed on the screen (1100).

The graphic user interfaces (1110, 1120) can be displayed as a response to the user action when an user action selecting one of the graphic objects that indicate the Pay TV Card or one of the disabled graphic objects that indicate the service providers is sensed. For example, the graphic user interfaces (1110, 1120) can be displayed when an user action selecting the graphic object (710) of the Pay TV Card Object (700) or one of the disabled graphic objects (730, 740, 750, 760, 770) is inputted.

The graphic user interface (1110) includes a box object (1111 to 1115). The user can input a zipcode by inputting numbers. Although, as an embodiment, the graphic interface (1110) receives zipcode as regional information, the present invention is not only limited to that and the display (302) can display a graphic user interface receiving area names and area codes.

The graphic user interface (1120) displays a number pad. The user can input numbers in a box object (1111 to 1115) by pressing number keys on a number pad (1120). Although the number pad is used as an embodiment of a graphic user interface for receiving regional information, the present invention is not limited to that and the display (302) can display the number pad.

Figure 12:
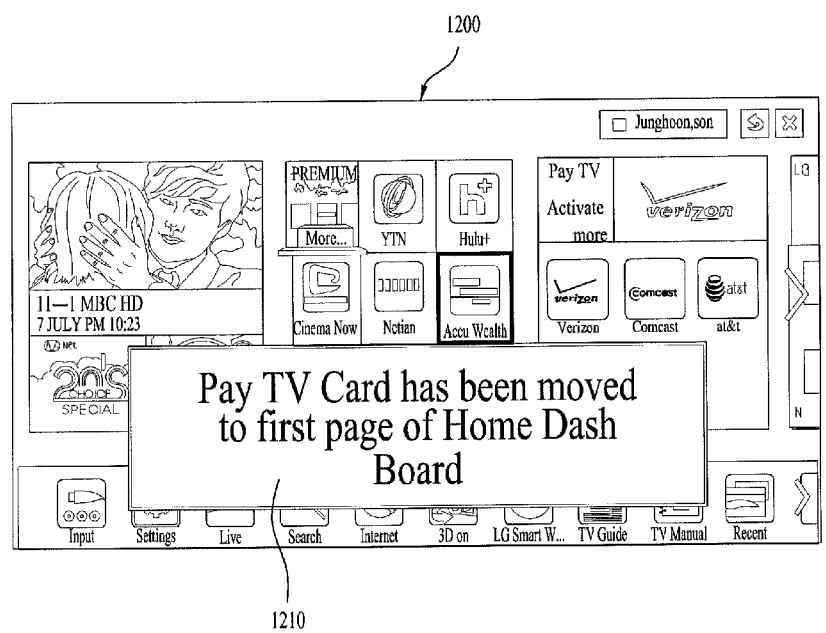
FIG. 12 is a drawing illustrating an embodiment of a screen displaying a message informing of the Pay TV Card Object's moving.

FIG. 12 is a drawing illustrating an embodiment of a screen displaying a message for alarming the movement of the Pay TV Card Object.

Referring to FIG. 12, the display (302) can display a screen (1200).

The screen (1200) displays a message (1210) alarming the movement of the Pay TV Card Object. The Pay TV Card Object can be moved if regional information is set in the electronic device (300). As an embodiment, the Pay TV Card Object can be moved to the first display page of the homepage. Also, the Pay TV Card Object can be moved to the third card object of the display page.

Figure 13:
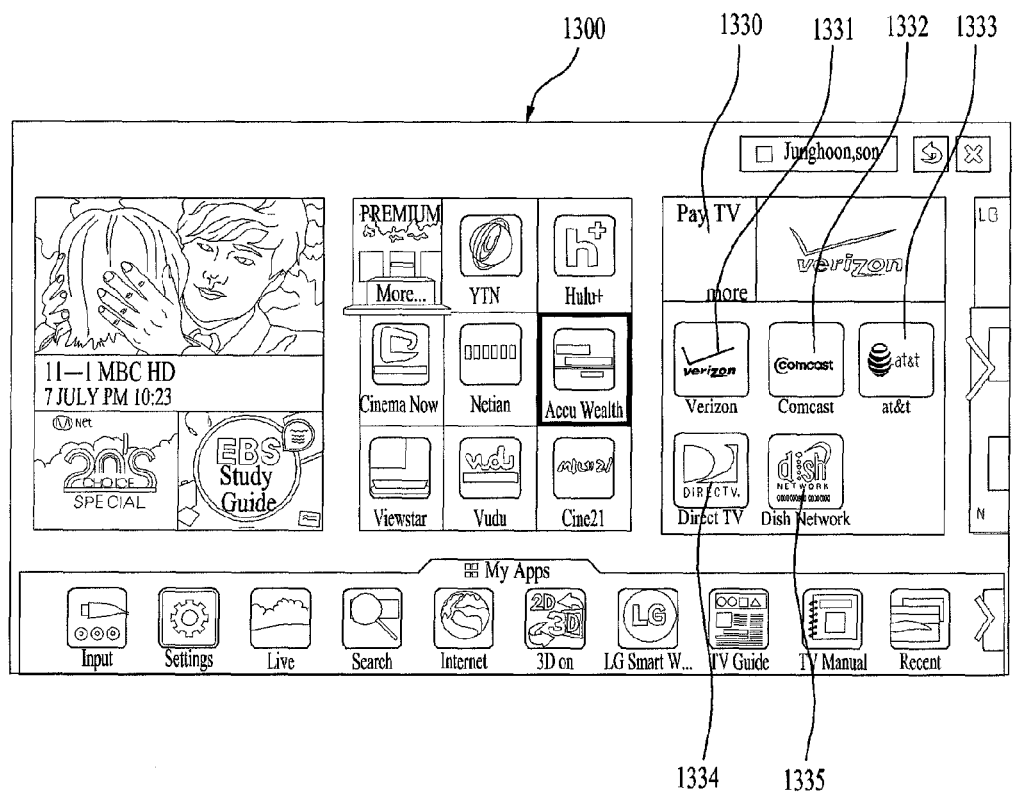
FIG. 13 is a drawing illustrating another embodiment of a screen displaying a display page including card objects.

FIG. 13 is a drawing illustrating another embodiment of a screen displaying a display page including card objects.

Referring to FIG. 13, the display (302) can display a screen (1300). In the case that regional information of the electronic device (300) is set on the screen (600) shown in FIG. 6, the screen (1300) can be displayed. The Pay TV Card Object (630) of the screen (600) shown in FIG. 6 moves to a point (1330) of the first display page (1300) of the homepage.

Graphic Objects (1331, 1332, 1333) related to regional information set in the electronic device (300) are enabled among graphic objects (1331, 1332, 1333, 1334, 1335) indicating service providers included in the Pay TV Card Object (1330) and the rest of the graphic objects (1334, 1335) are disabled. In the case that the graphic objects (1334, 1335) are displayed disabled on the screen (600), disabling will be stayed.

Figure 14:
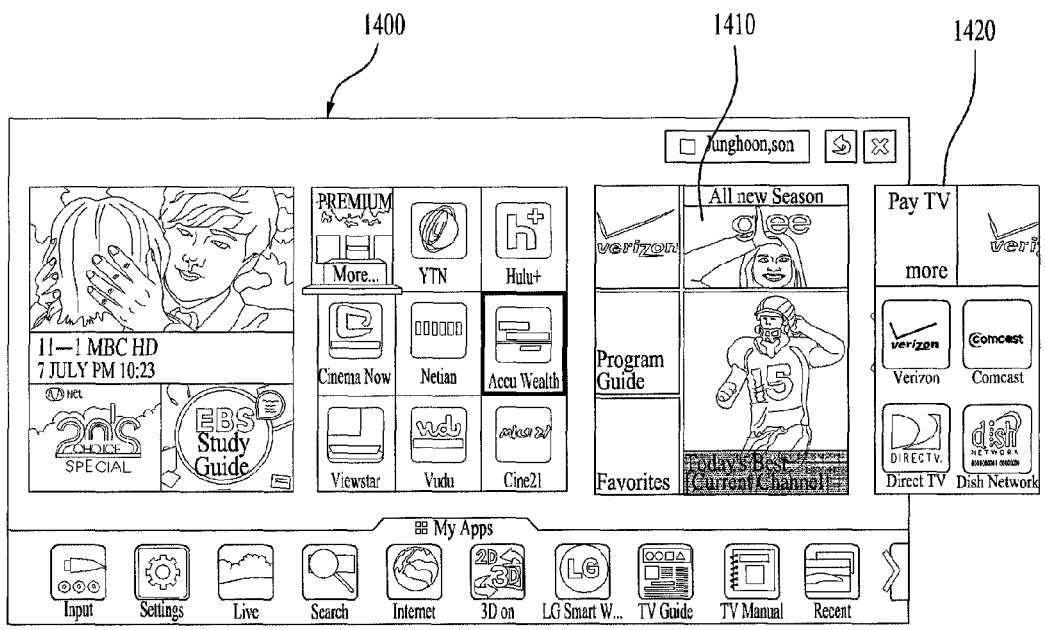
FIG. 14 is a drawing illustrating an embodiment of a screen displaying a Pay TV Exclusive Card Object.

FIG. 14 is a drawing of an embodiment illustrating a screen displaying a Pay TV Exclusive Card Object.

Referring to FIG. 14, the display (302) can display a screen (1400). The Pay TV Exclusive Card Object can be displayed on the screen (1400).

The Pay TV Exclusive Card Object (1410) can be displayed as a response to the user action in the case that a user action selecting the enabled graphic object of the graphic objects indicating service providers included in the Pay TV Card Object is sensed.

For example, the controller (340) can control such that the screen (1400) can be displayed in response to the user action in the case that the user action selecting the graphic object (1331) on the screen (1300) shown in FIG. 13 is sensed. Here, the Pay TV Exclusive Card Object (1410) can be displayed at the point where the Pay TV Card Object (1330) is located and the Pay TV Card Object (1330) can move to the point (1420). Here, the point (1420) can be located on the next display page of the display page (1400).

Figure 15:
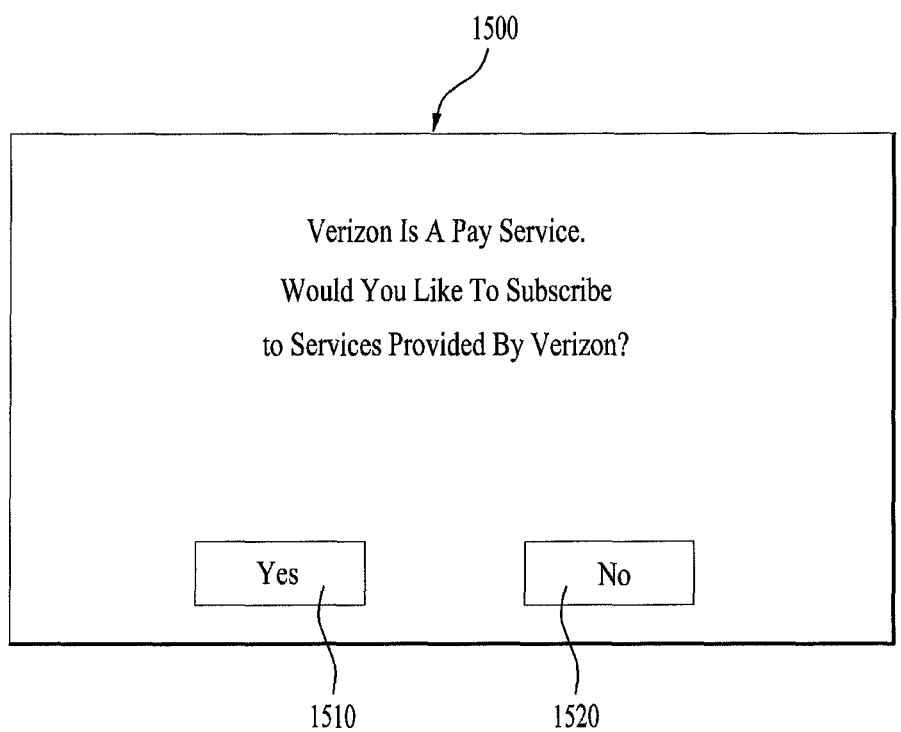
FIG. 15 is a drawing illustrating an embodiment of a screen displaying a display page for subscribing to a service provided by a service provider.

FIG. 15 is a drawing illustrating an embodiment of a screen displaying a display page for subscribing to services provided by service providers.

Referring to FIG. 15, the display (302) can display a display page (1500). The display page (1500) is a display page for subscribing to services provided by service providers.

The display page (1500) includes a phrase for informing of service providers' subscription, a "Yes" button (1510) for subscription approval, and a "No" button (1520) for subscription refusal. In the case of sensing the user action selecting the Yes button (1510), the Pay TV Exclusive Card Object (1410) shown in FIG. 14 can be directly displayed and a display page for additional subscription processes can be displayed.

As an embodiment, the display page (1500) can be displayed in the case that the user action selecting the enabled graphic object among graphic objects indicating service providers included in the Pay TV Card Object is sensed and in the case that the selected graphic object indicating service providers is not subscribed.

As an embodiment, the display page (1500) can be displayed in the case that the user action selecting the enabled graphic object among graphic objects indicating service providers included in the Pay TV Card Object is sensed and in the case that the electronic object (300) is for the first time connected to a service provider indicated by the selected graphic object.

Figure 16:
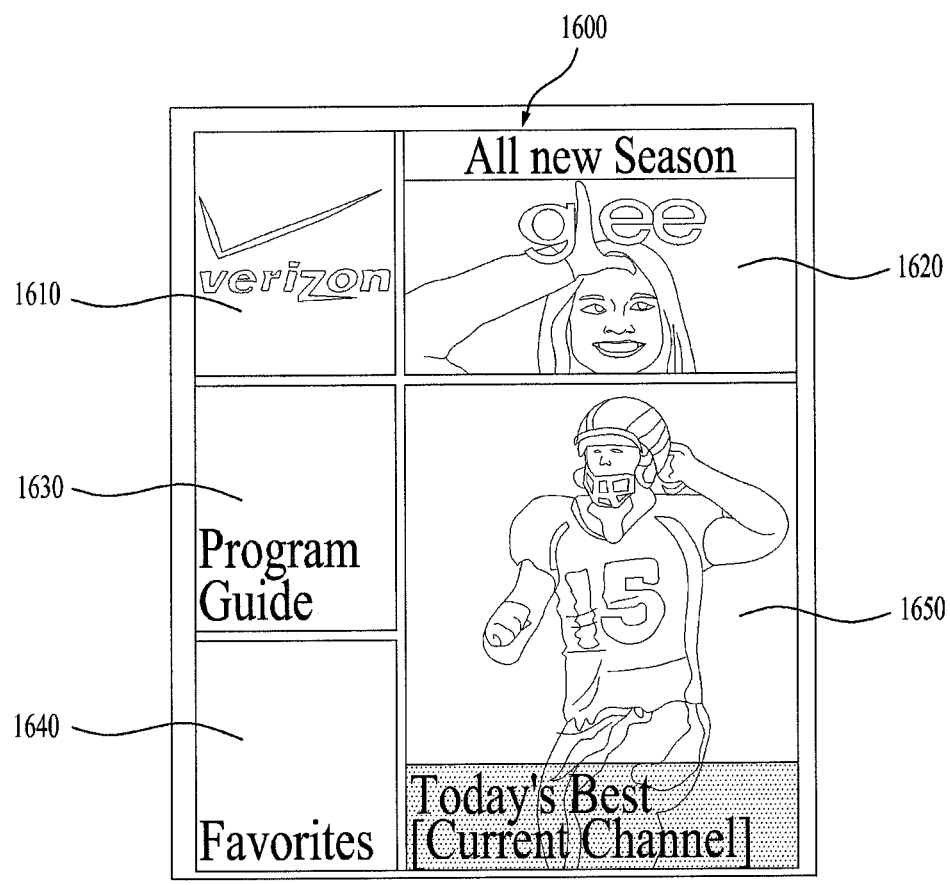
FIG. 16 is a drawing illustrating an embodiment of a Pay TV Exclusive Card Object.

FIG. 16 is a drawing illustrating an embodiment of a Pay TV Exclusive Card Object.

Referring to FIG. 16, the Pay TV Exclusive Card Object is a card object displaying services provided by service providers.

A Pay TV Exclusive Card Object (1600) is to indicate services provided by the service provider, "Verizon". The Pay TV Exclusive Card Object (1600) includes graphic objects (1610 to 1650).

The graphic object (1610) indicates that the card object (1600) is the Pay TV Exclusive Card Object of the service provider, "Verizon".

The graphic object (1620) displays commercials provided by the service provider. "Verizon".

The graphic object (1630) is a button for requesting a display about a program guide provided by the service provider, "Verizon".

The graphic object (1640) is a button for requesting a display of favorite services provided by the service provider, "Verizon".

Figure 17:
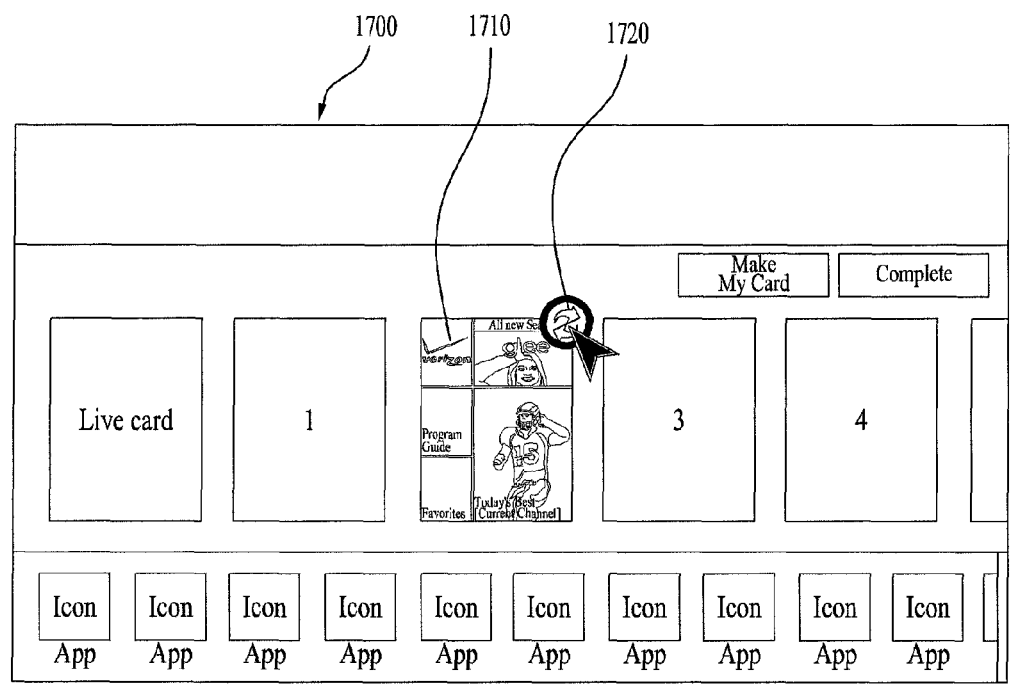
FIG. 17 is a drawing illustrating another embodiment of a screen displaying a Pay TV Exclusive Card.

FIG. 17 is a drawing illustrating an embodiment of a screen displaying a Pay TV Exclusive Card Object.

Referring to FIG. 17, it can be limited to only one Pay TV Exclusive Card Object to be displayed as an embodiment. If the display of the Pay TV Exclusive Card Object is limited to one, in the case that a user is subscribed to a plurality of service providers, resource waste can be reduced, which is caused by connecting to a plurality of the subscribed service providers.

In the case that the user is subscribed to a plurality of services, a button (1720) for changing the Pay TV Exclusive Card Object can be displayed on the screen (1700). The button (1720) can be displayed on the Pay TV Exclusive Card Object (1710) and can be displayed near the Pay TV Exclusive Card Object (1710).

As an embodiment, a plurality of the Pay TV Exclusive Card Objects can be displayed on the screen.

Figure 18:
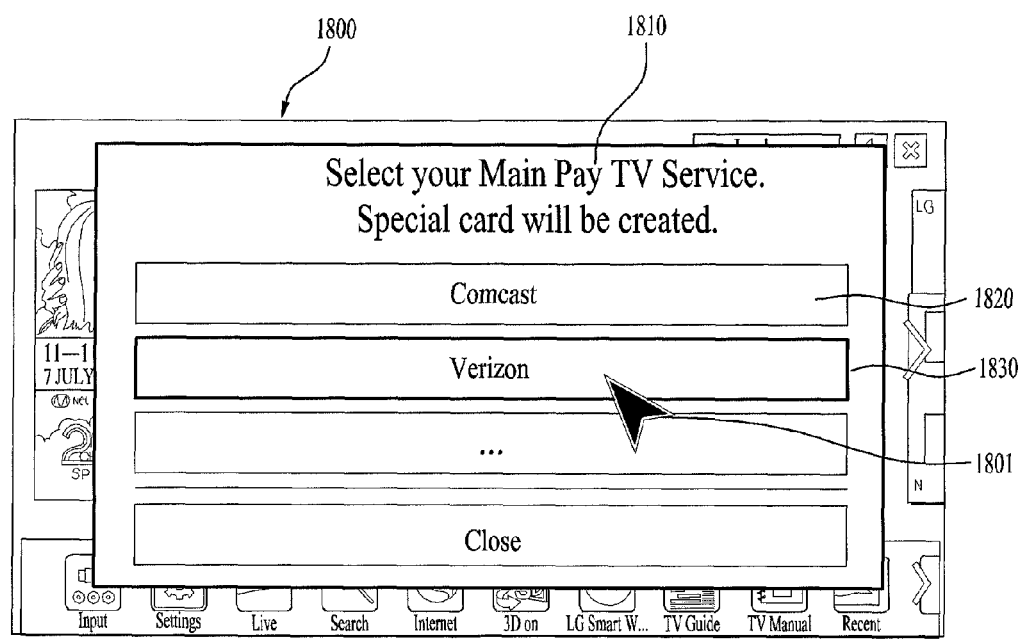
FIG. 18 is a drawing illustrating an embodiment of a screen displaying a list for selecting a service provider.

FIG. 18 is a drawing illustrating an embodiment of a screen displaying a list for selecting a service provider.

Referring to FIG. 18, in the case that a user action selecting the button (1720) shown in FIG. 17 is sensed, the controller (340) can control such that a list (1810) on a screen (1800) can be displayed. The list (1810) lists service providers subscribed by the user. The user can select a specified service provider by moving a display pointer (1801) or identifier (1803).

Figure 19:
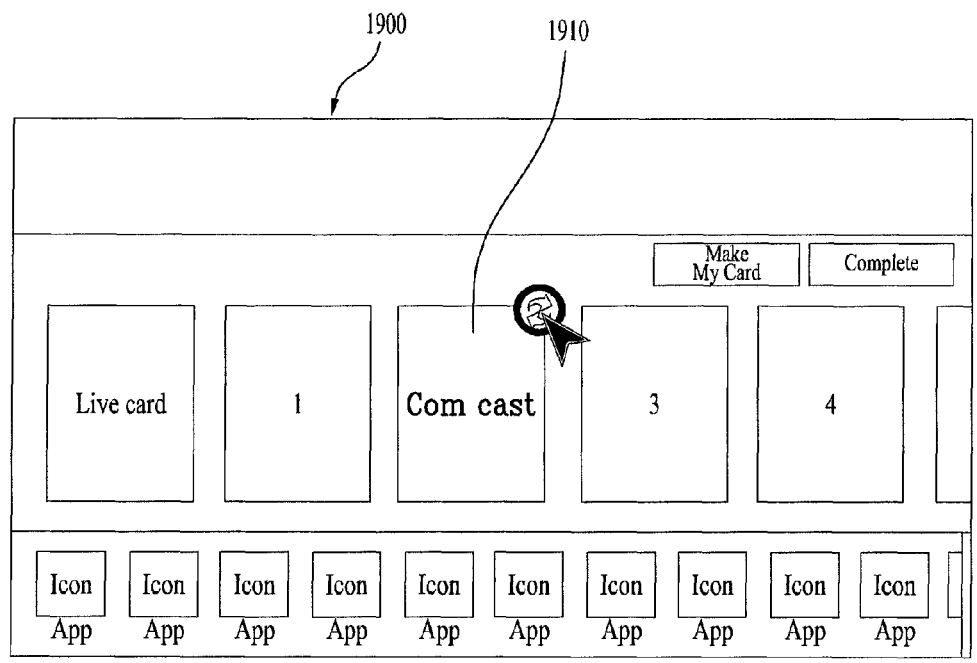
FIG. 19 is a drawing illustrating another embodiment of a screen displaying a Pay TV Exclusive Card Object.

FIG. 19 is a drawing illustrating another embodiment of a screen displaying a Pay TV Exclusive Card Object.

Referring to FIG. 19, the display (302) can display a screen (1900). The screen (1900) is a screen displayed with the outcome selecting the service provider, "Comcast" (1820) in the list (1810) shown in FIG. 18.

Figure 20:
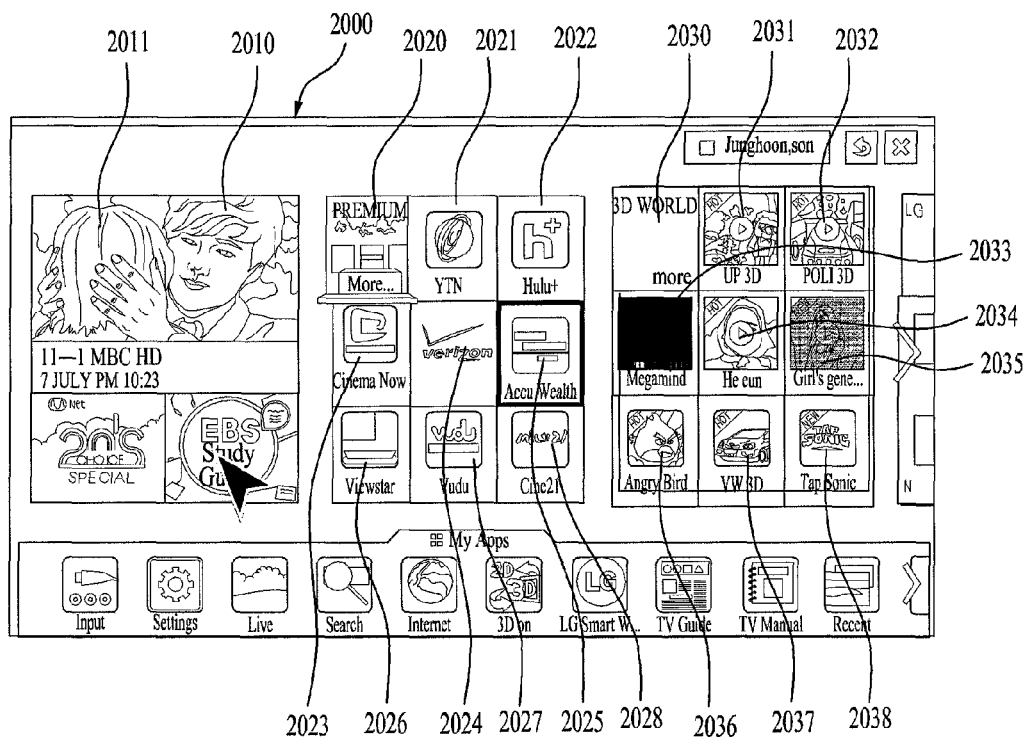
FIG. 20 is a drawing illustrating another embodiment of a screen displaying a display page including card objects.

FIG. 20 is a drawing illustrating another embodiment of a screen displaying a display page including card objects.

Referring to FIG. 20, the display (302) can display a screen (2000). The screen (2000) displays a display page including card objects (2010, 2020, 2030). The display page (2000) is a first display page of the homepage.

The card object (2010) includes a graphic object (2011) displaying a live broadcast program being received by the tuner (305) or network interface unit (320).

The card object (2020) is a premium card object. The premium card object includes graphic objects (2021 to 2028) indicating service providers or main contents providers, or recommending contents providers or service providers.

The card object (2030) includes graphic objects (2031 to 2038) indicating 3D contents.

Figure 21:
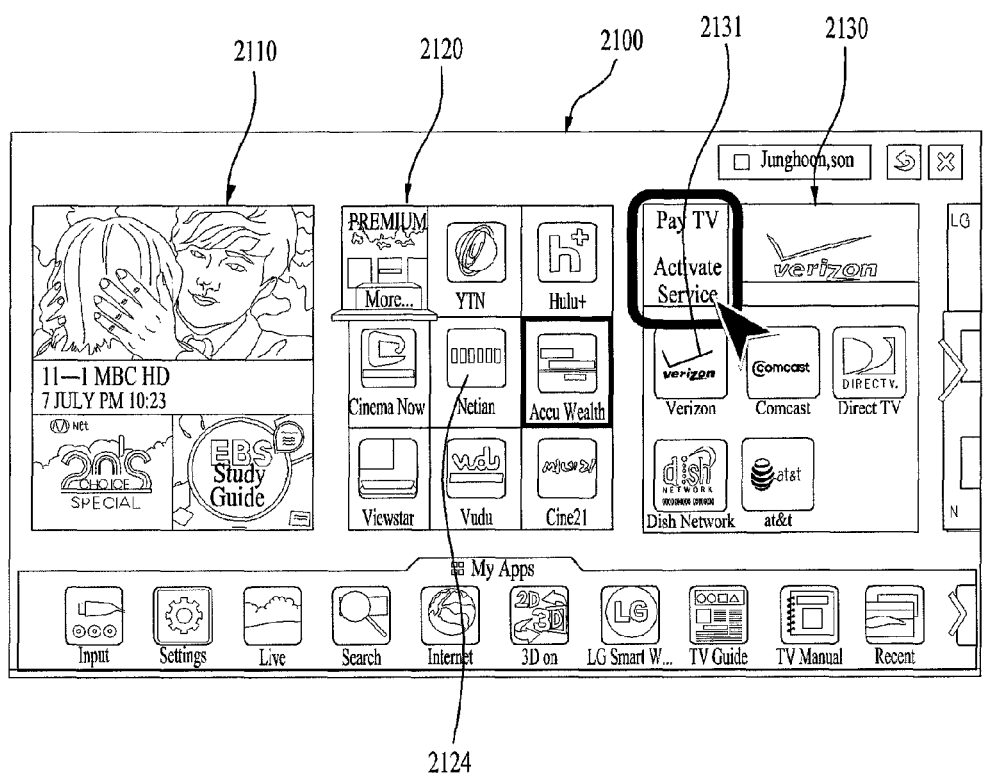
FIG. 21 is a drawing illustrating another embodiment of a screen displaying a display page including card objects.

FIG. 21 is a drawing illustrating another embodiment of a screen displaying a display page including card objects.

Referring to FIG. 21, the display (302) can display a screen (2100). In the case that software is upgraded on the screen (2000), the screen (2100) can be displayed. The upgrade means upgrading software for supporting the Pay TV Card Object. In the case that a user action selecting a graphic object indicating a service provider providing services related to the Pay TV Exclusive Card among graphic objects included in the premium card object (2020) is sensed, the controller (340) can control such that the software can be upgraded in response to the user action. The services related to the Pay TV Exclusive Card Object mean services provided through a graphic object included in the Pay TV Exclusive Card Object.

For example, in the case that a user action selecting the graphic object (2024) indicating the service provider, "Verizon", on the screen (2000), is sensed, upgrading the software can be performed. The service provider, "Verizon", provides the Pay TV Exclusive Card Object with the electronic device (300).

The screen (2100) displays a display page including the card object (2110), card object (2120), and card object (2130). The card object (2110) or card object (2120) are synchronized card objects with the card object (2010) and card object (2020) shown in FIG. 20. But, the graphic object (2024) indicating the service provider "Verizon" will be deleted from the card object (2120). A different graphic object (2124) will be located in the place of graphic object (2024).

The card object (2130) is a Pay TV Card Object. The Pay TV Card Object (2130) includes a graphic object (2131) indicating the service provider "Verizon". Also, the Pay TV Card Object (2130) will be located in the place where the card object (2030) is located. Accordingly, the card object (2030) can automatically move to the second display page of the homepage.

Figure 22:
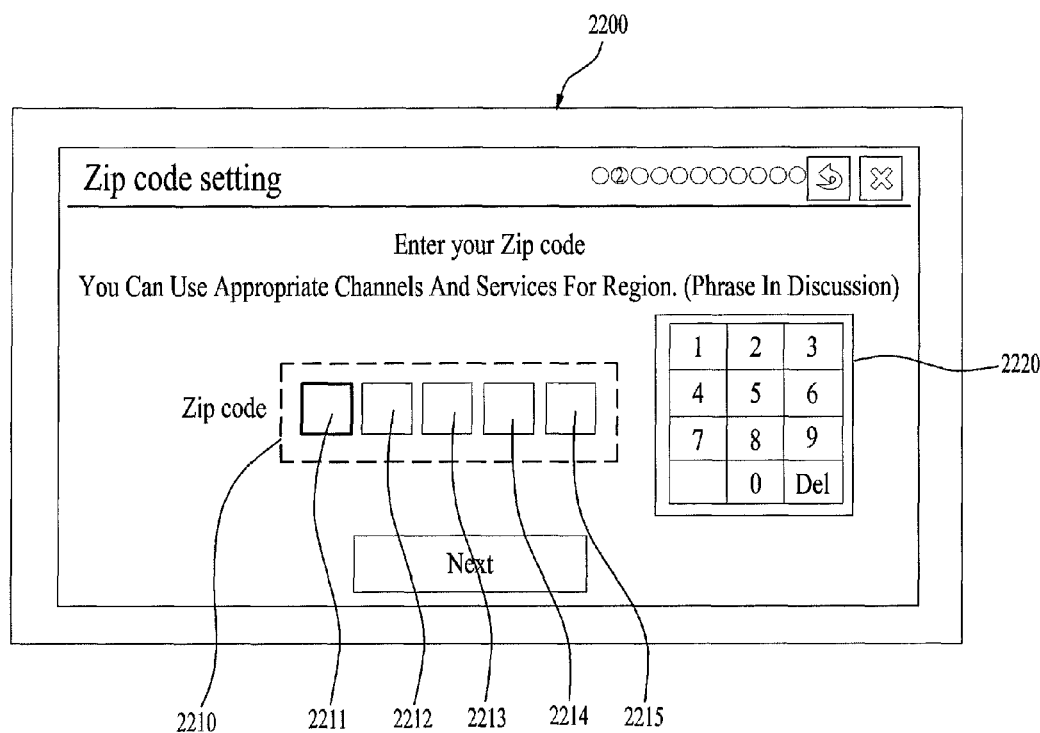
FIG. 22 is a drawing illustrating another embodiment of a screen displaying a graphic user interface for receiving regional information input.

FIG. 22 is a drawing illustrating another embodiment of a screen displaying a graphic user interface for receiving regional information inputs.

Referring to FIG. 22, the display (302) can display a screen (2200). The screen (2200) can be displayed in the pre-setting process. The pre-setting process means a process in which condition variables of the electronic device (300) are set after purchasing the electronic device (300).

Also, the screen (2200) can be the execution screen of the Setup Wizard. The setup wizard is an application executed by the controller (340).

The screen (2200) displays graphic user interfaces (2210, 2220) for receiving regional information input.

The graphic user interface (2210) includes box objects (2211 to 2215). The user can input a zipcode by inputting numbers in the box objects (2211 to 2215). Although the graphic user interface (2210) receiving zipcode as regional information is exemplified as an embodiment, the present invention is not limited only to that and the display (302) can display a graphic user interface receiving area names and area codes.

The graphic user interface (2220) displays a number pad. The user can input numbers in the box objects (2211 to 2215) by pressing number keys included in the number pad (2220). Although the graphic user interface (2210) using the number pad to receive regional information is exemplified as an embodiment, the present invention is not limited only to that and the display (302) can display a text pad.

FIG. 23 is a drawing illustrating an execution process of Setup Wizard.

Referring to FIG. 23, the Setup Wizard includes at least one of language selection (S1), User Condition Selection (S2), Country Selection (S3), Set Password (S4), Set Timezone (S5), Set Auto Save Mode (S6), Connect Network (S7), Set Retional Information (S8), Set Auto Channel (S9), Set Universal Remote Controller (S10) and Complete Setting (S11) steps. The Setup Wizard can execute the steps in the order listed in FIG. 23, regardless of the order, and according to a sensed user action selecting the order.

Figure 24:
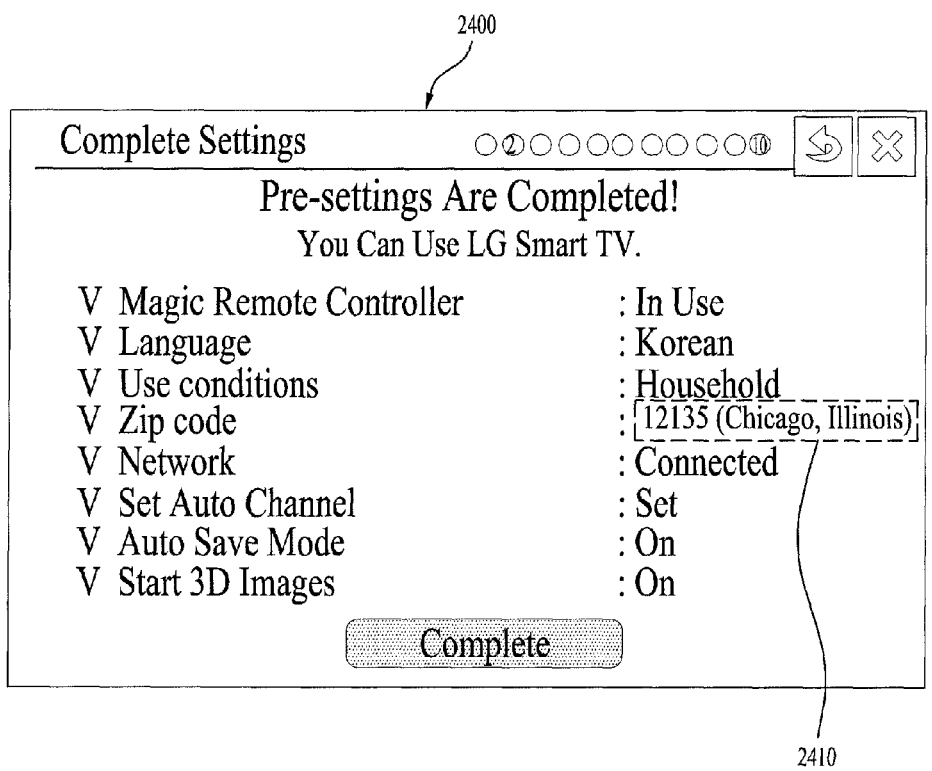
FIG. 24 is a drawing illustrating an embodiment of a screen displaying a display page informing of pre-settings completion.

FIG. 24 is a drawing illustrating an embodiment of a screen displaying a display page informing of the pre-set completion.

Referring to FIG. 24, the display (302) can display a screen (2400). The screen (2400) can be displayed at the step of Settings Complete (S11) shown in FIG. 23.

The screen (2400) displays regional information (2410) set in the electronic device (300). The controller (340) transmits the regional information (2410) to the first server (10) and controls such that information about the service provider related to the regional information (2410) can be received from the first server (10) in response to the transmission.

Figure 25:
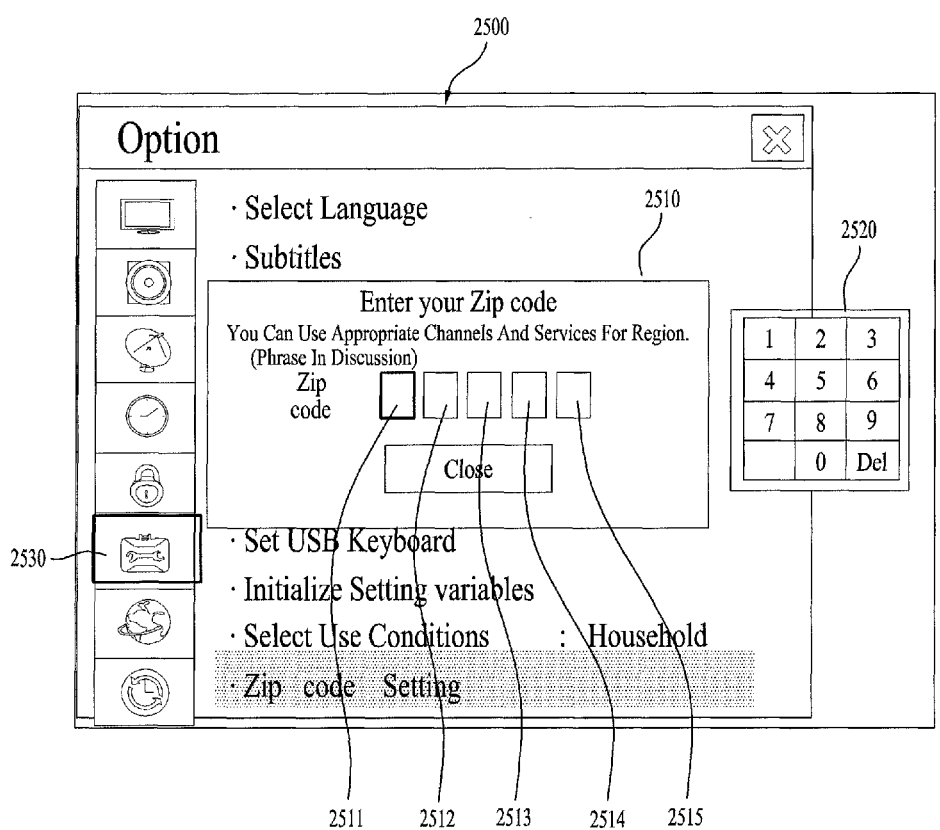
FIG. 25 is a drawing illustrating another embodiment of a screen displaying a graphic user interface for receiving regional information input.

FIG. 25 is a drawing illustrating another embodiment of a screen displaying a graphic user interface for receiving regional information input.

Referring to FIG. 25, the display (302) can display a screen (2500). The screen (2500) can display graphic user interfaces (2510, 2520) for receiving regional information input with a menu screen in the background.

In the case that a user action selecting a menu item (253) for setting regional information is sensed in the menu screen (2500), the controller (340) can control such that the graphic user interfaces (2510, 2520) can be displayed in response to the user action. That is, the graphic user interfaces (2510, 2520) can be displayed as a user action selecting the menu item (2530) provided by the menu screen (2500). In the case that pre-set regional information exists, instead of the graphic user interface (2510), a graphic user interface (2810) shown in FIG. 28 can be displayed.

The graphic user interface (2510) includes box objects (2511 to 2515). The user can input a zipcode by inputting numbers in the box objects (2511 to 2515). Although the graphic user interface (2510) receives zipcode as regional information as an embodiment, the present invention is not limited only to that, and the display (302) can display a graphic user interface that can receive area names and area codes.

The graphic user interface (2520) displays a number pad. The user inputs numbers in the box objects (2511 to 2515) by pressing number keys included in the number pad (2520). In the embodiment, although the graphic user interface for receiving regional information by the number pad is exemplified, the present invention is not limited only to that, and the display (302) can display a text pad.

Figure 26:
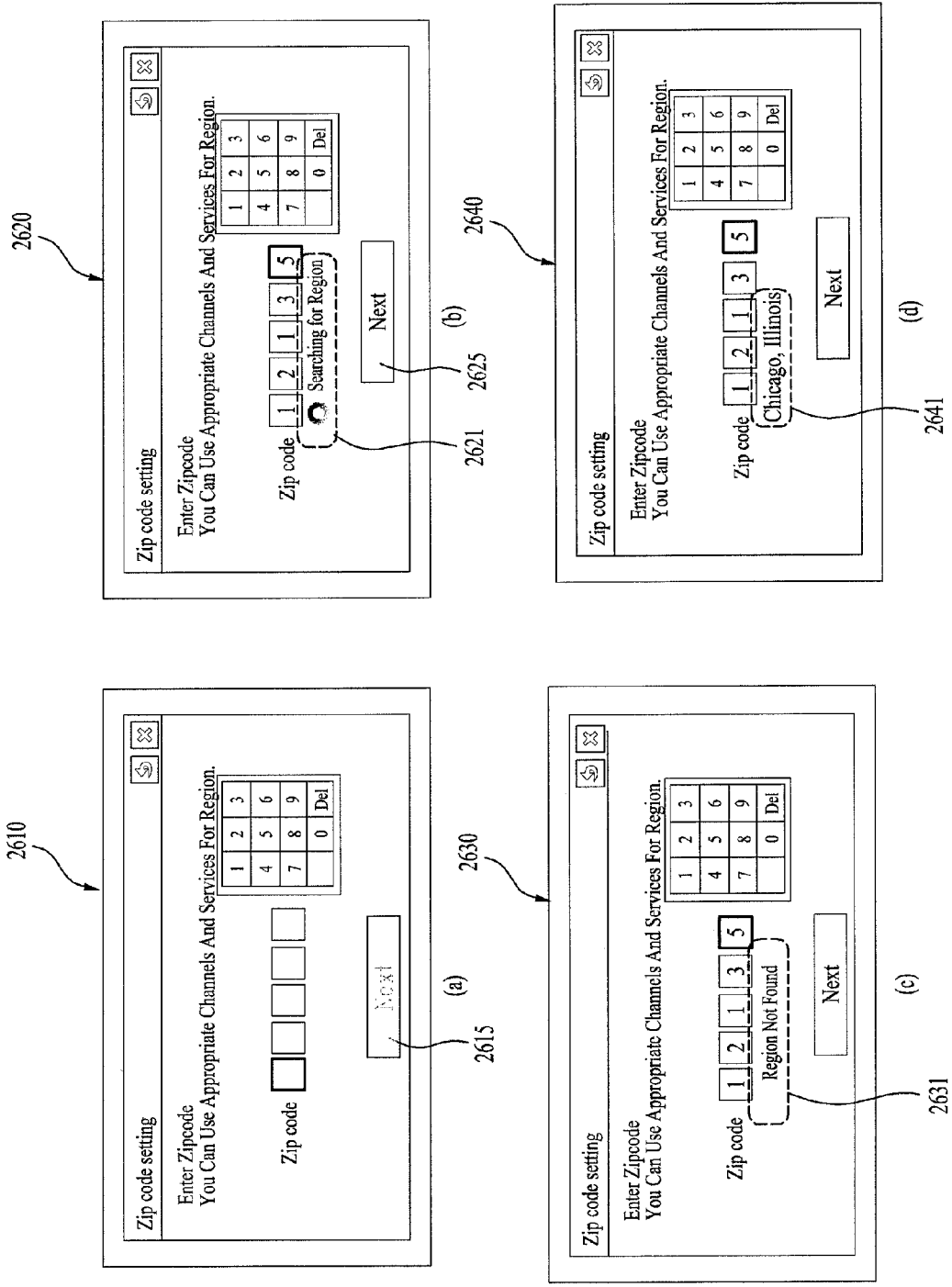
FIG. 26 is a drawing illustrating an embodiment of information change displayed in the graphic user interface during the regional information setting process.

FIG. 26 is a drawing illustrating an embodiment of information change indicated in a graphic user interface in the regional information setting process.

Referring to FIG. 26, a graphic user interface (2610) of FIG. 26(a) is an initial image of the graphic user interface for receiving regional information. The graphic user interface (2610) includes a "Next" button (2615). The Next button (2615) can be displayed disabled such that it cannot be selected.

In the case that the user completes regional information (12135) input, the display (302) displays the graphic user interface (2620) of FIG. 26(b). The graphic user interface (2620) displays an information phrase (2621) that the area is being searched for and the Next button (2625). The Next button (2625) is displayed enabled such that it can be selected. That is, in the case that the regional information (12135) input is completed, the Next button (2615) can be automatically enabled.

In the case that the area search is completed, the display (302) can display a graphic user interface (2630) or graphic user interface (2640).

In the case that the area search fails, the controller (340) controls such that the graphic user interface (2630) can be displayed. The graphic user interface (2630) displays a phrase indicating that the area matching the inputted regional information (12135) is not found.

In the case that the area search succeeds, the controller (340) controls such that the graphic user interface (2640) can be displayed. The graphic user interface (2640) displays an area name (2641) matching the inputted regional information (12135).

Figure 27:
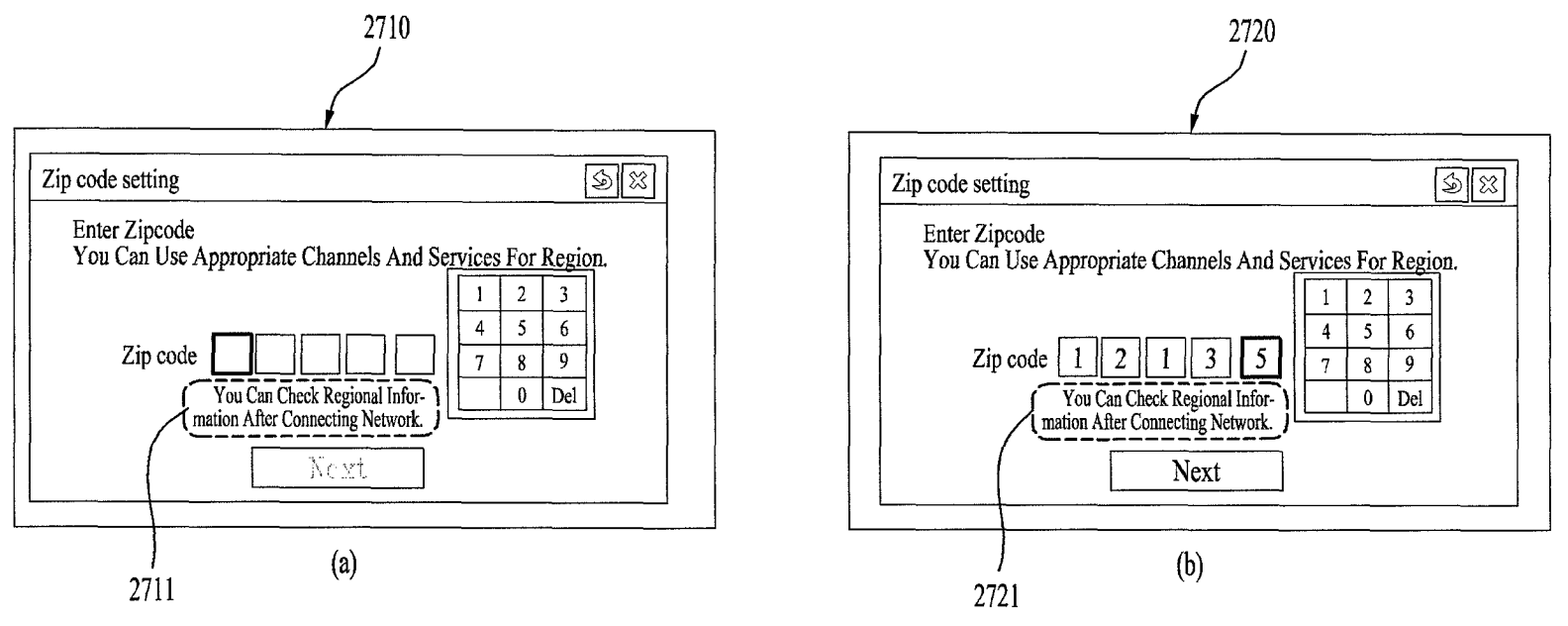

FIG. 27 is a drawing illustrating another embodiment of information change displayed on the graphic user interface in the regional information setting process.

Referring to FIG. 27, a graphic user interface (2710) of FIG. 27(a) is an initial image of a graphic user interface for receiving regional information input. The graphic user interface (2710) displays a phrase that network connection is required.

In the case that the user completes inputting regional information (12135), the display (302) displays a graphic user interface (2720) of FIG. 27(b). The graphic user interface (2720) displays a phrase (2721) informing that network connection is required.

Figure 28:
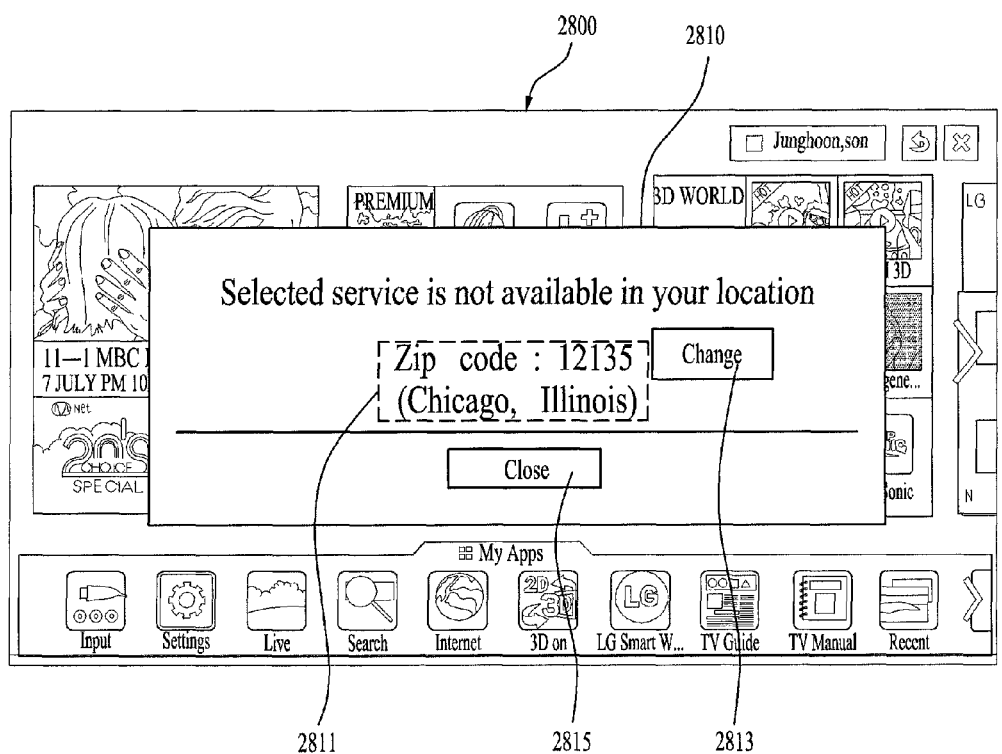
FIG. 28 is a drawing illustrating another embodiment of a screen displaying a graphic user interface for receiving regional information input.

FIG. 28 is a drawing illustrating another embodiment of a screen displaying a graphic user interface for receiving regional information input.

Referring to FIG. 28, the display (302) can display a screen (2800). The screen (2800) displays a graphic user interface (2810) for receiving regional information input.

The graphic user interface (2810) includes regional information (2811), a Change button (2813), and a Close button (2815).

The displayed regional information (2811) can be pre-set regional information or location information obtained by the location information module (395).

In the case that a user action selecting the Change button (2813) is sensed, in response to the user action, the controller (340) controls such that the graphic user interface changing the regional information (2811) can be displayed.

In the case that a user action selecting the Close button (2815) is sensed, the controller (340) controls such that the graphic user interface (2810) can be disappeared on the screen (2800).

Figure 29:
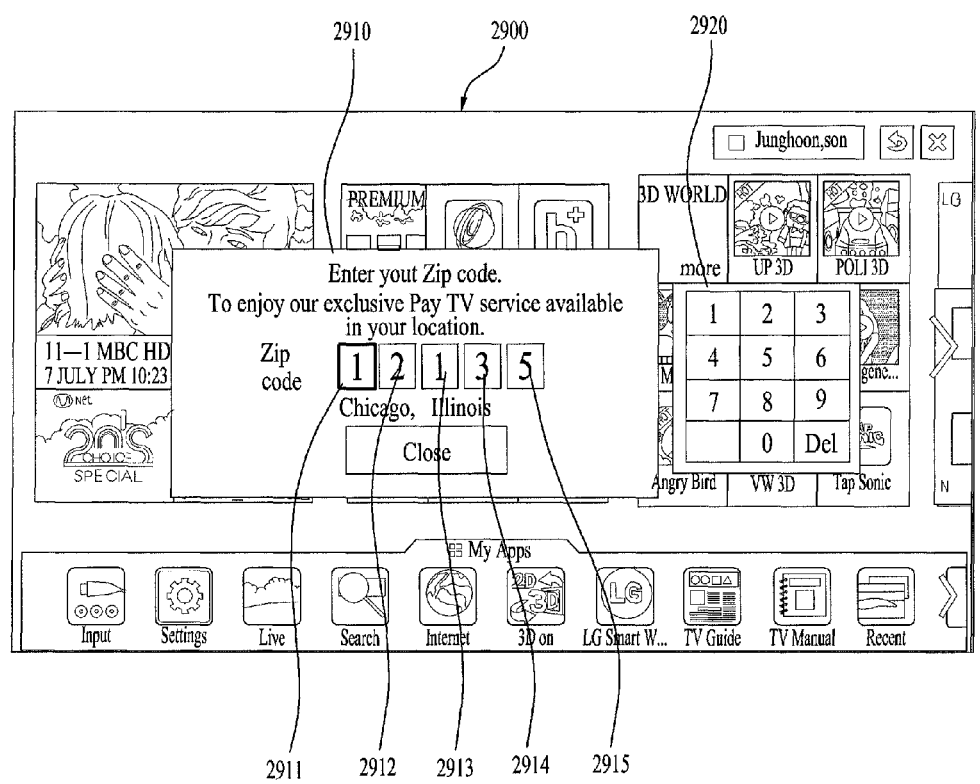
FIG. 29 is a drawing illustrating another embodiment of a screen displaying a graphic user interface for receiving regional information input.

FIG. 29 is a drawing of another embodiment of a screen displaying a graphic user interface for receiving regional information input.

Referring to FIG. 29, the display can display a screen (2900). In the case that the Change button (2813) shown in FIG. 28 is pressed, the screen (2900) can be displayed.

The screen (2900) displays graphic user interfaces (2910, 2920) for receiving regional information input.

The graphic user interface (2910) includes box objects (2911 to 2915). The box objects (2911 to 2915) indicate regional information (2815) shown in FIG. 28. The user can correct texts or numbers displayed in the box objects (2911 to 2915) by inputting numbers in the box objects (2911 to 2915).

The graphic user interface (2920) displays a number pad. The user inputs numbers in the box objects (2911 to 2915) by pressing number keys included in the number pad (2920). In the embodiment, although the graphic user interface for inputting regional information by the number pad, the present invention is not limited to that and the display (302) can display a text pad.

Figure 30:
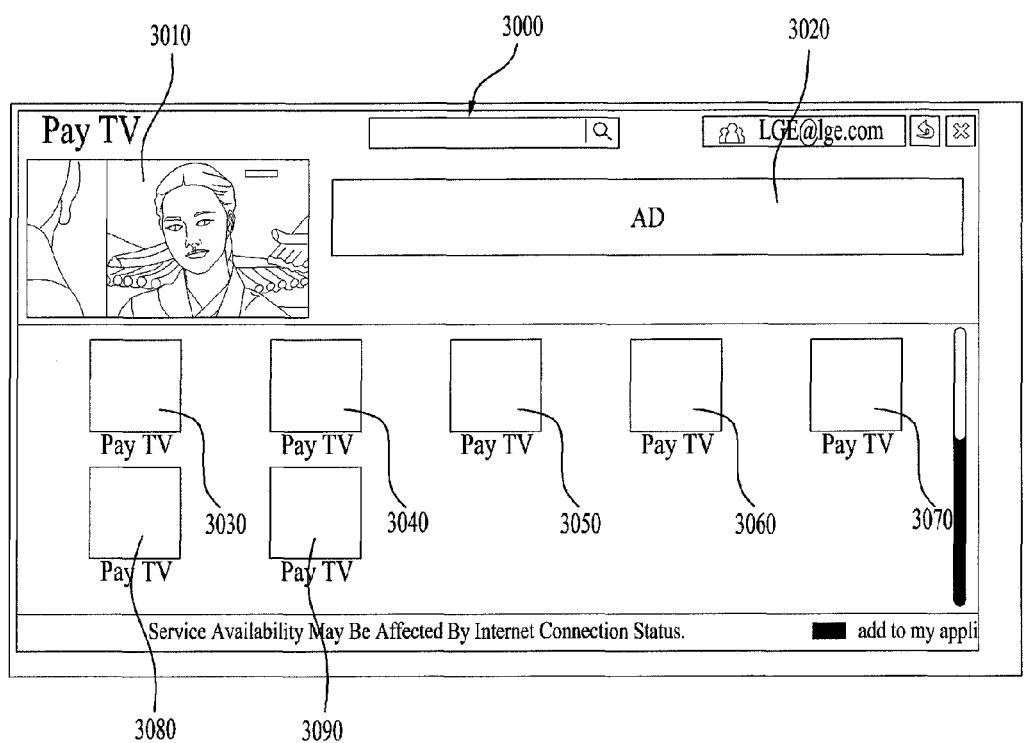
FIG. 30 is a drawing illustrating an embodiment of a Pay TV Display page.

FIG. 30 is a drawing illustrating an embodiment of a Pay TV Display Page.

Referring to FIG. 30, the display (302) can display a screen (3000). In the case that a user action requesting for displaying the Pay TV Card Object in full page is sensed, the controller (340) controls such that the screen (3000) can be displayed in response to the user action. The user action can be a user action selecting the More button (715) shown in FIG. 10.

A screen (3000) displays graphic objects (3010 to 3090).

The graphic object (3010) displays live broadcast programs received from the present tuner (305) or the network interface unit (320).

The graphic object (3020) displays commercials images. The commercials images can be provided by the first server (10).

The graphic objects (3030 to 3090) indicate service providers. The service providers can be service providers providing pay services.

Figure 31:
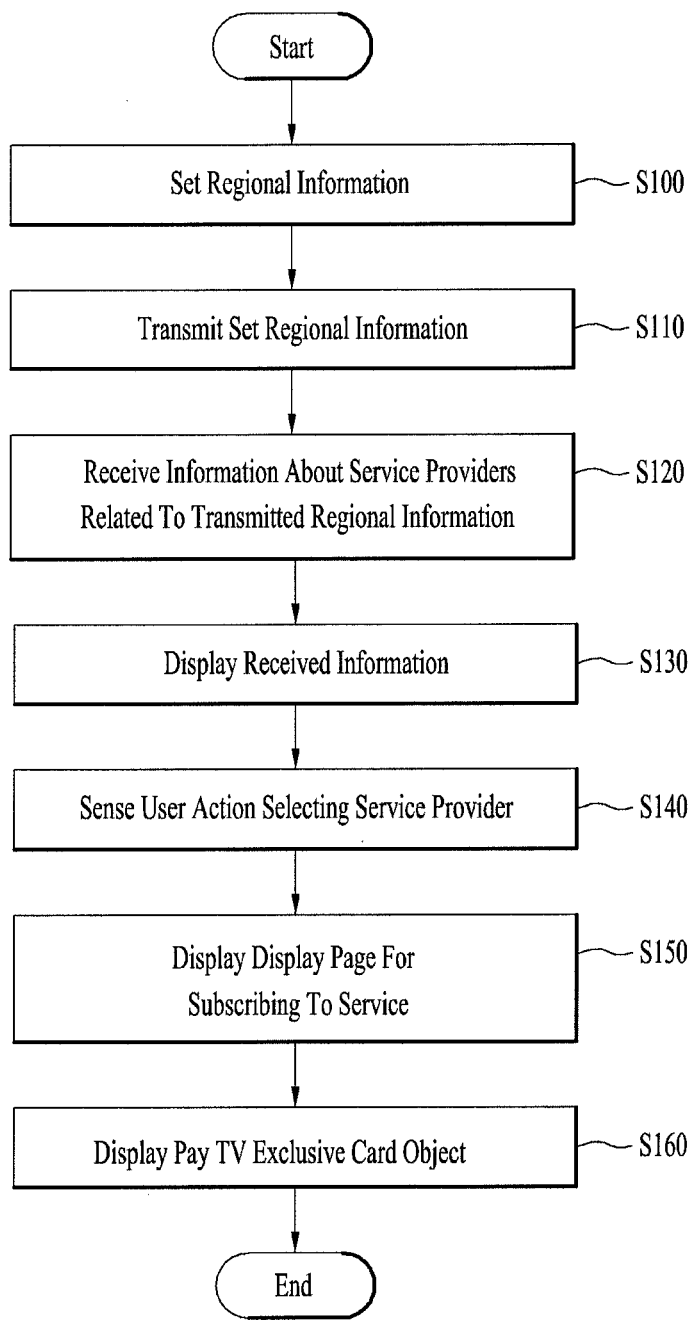
FIG. 31 is a flowchart illustrating an appropriate embodiment of the executing process for a method providing information about service providers according to the present invention.

FIG. 31 is a flowchart illustrating an appropriate embodiment about a method of providing information about service providers according to the present invention.

Referring to FIG. 31, the controller (340) sets regional information of the electronic device (300) based on regional information received from a user interface or regional information obtained by the location information module (395) (S100). The user interface includes at least one of the graphic user interfaces (1110, 1120) shown in FIG. 11, the graphic user interfaces (2210, 2220) shown in FIG. 12, the graphic user interfaces (2510, 2520) shown in FIG. 25, and the graphic user interfaces (2910, 2920) shown in FIG. 29.

The step of S100 can include the information changing process shown in FIG. 26 and the information changing process shown in FIG. 27.

The network interface unit (320) transmits the set regional information to the server (S110). The server can be the first server (10).

The network interface unit (320) receives information about the service provider related to regional information transmitted from the server in the step of S110. Information about the received service provider can be the list (400) shown in FIG. 4 or the list (500) shown in FIG. 5.

The controller (340) controls such that information about the service provider received in the step of S120 can be displayed (S130). The display (302) can display information about the service provider.

In the step of S130, the controller (340) enables the graphic object indicating the service provider related to regional information set in S100 and disables the graphic object indicating the service provider unrelated to the regional information. In the case that the display (302) indicating the service provider displays the service provider disabled prior to the step of S130, the graphic object indicating the service provider related to regional information set in the step of S100 is enabled and displayed and the rest will stay disabled.

In the step of S130, the display (302) displays the screen (1300) shown in FIG. 13. Information about the service provider received in the step of S120 can be displayed in the TV Card Object (1330). As an embodiment, in the step of S1300, the controller (340) can move the Pay TV Card Object to the first page of the homepage.

The controller (340) senses a user action selecting a service provider. Here, the user action can be a user action selecting the enabled graphic object in the step of S130. That is, the controller (340) considers that the service provider indicated by the selected graphic object is selected. For example, the user action can be a user action selecting one of the graphic objects (1331, 1332, 1333) on the screen (1300) shown in FIG. 13.

In response to the user action, the controller (340) provides a display page for subscribing to services provided by the selected service provider. The display (302) can display a display for subscribing to the services. The display page can be the display page shown in FIG. 15. The display page can be one stored in the storage (345) and one transmitted by the selected service provider or the first server.

The display (302) displays Pay TV Exclusive Card Objects (S160). In the step of S160, the display (302) displays the screen (1400) shown in FIG. 14.

The controller (340) can generate the Pay TV Exclusive Card Object and the service provider can provide the Pay TV Exclusive Card Object. The Pay TV exclusive Card Object can be the Pay TV Exclusive Card Object (1600) shown in FIG. 16. In the case that there are a plurality of Pay TV Exclusive Card Objects, one Pay TV Exclusive Card Object is displayed and a button for changing the Pay TV Exclusive Card Object can be displayed. The button can be a button (1720) shown in FIG. 17.

As an embodiment, the step of S160 can be performed after the step of S140.

As an embodiment, the step of S160 can be performed after the step of S150. That is, in the case that subscribing to services provided by the service provider is complete, the step of S160 can be executed.

Figure 32:
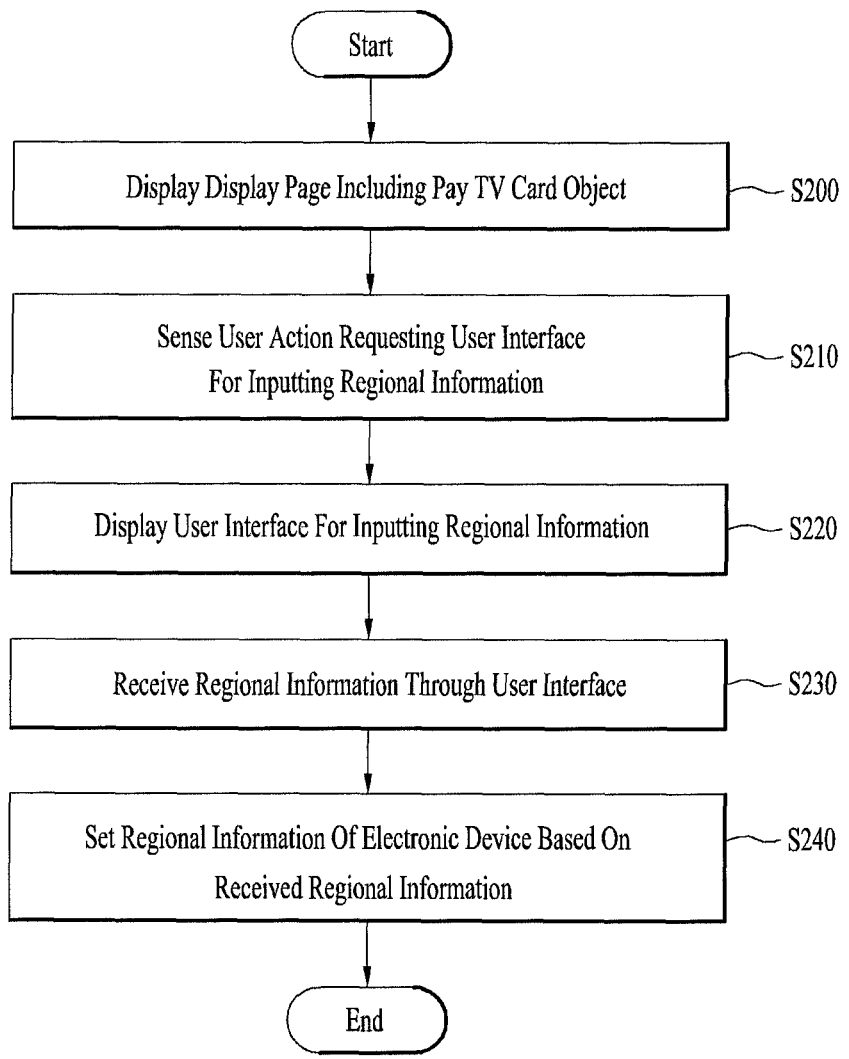
FIG. 32 is a flowchart illustrating an appropriate embodiment of the executing process about a method for setting regional information according to the present invention.

FIG. 32 is a flowchart illustrating the executing process of an appropriate embodiment about a method of setting regional information according to the present invention.

Referring to FIG. 32, the display (302) can display a display page including the Pay TV Card Object (S200). The Pay TV Card Object can include at least one of the Pay TV Card Objects (700) shown in FIG. 7, Pay TV Objects (800) shown in FIG. 8, and Pay TV Objects (900) shown in FIG. 9.

As an embodiment, the display page displayed in the step of S200 can be a display page (600) shown in FIG. 6.

As an embodiment, the display page displayed in the step of S200 can be a display page (2100) shown in FIG. 21. The step of S200 can include a step of the display (302) displaying the display page (2000) shown in FIG. 20; a step of sensing a user action selecting a graphic object indicating the service provider providing services related to the Pay TV Exclusive Card Object among graphic objects including the premium card object (2020); and a step of the controller (340) controlling the upgrading of software for adding the Pay TV function in response to the user action.

The controller (340) senses a user action requesting for the user interface to input regional information (S210). The user action can be one selecting a graphic object disabled among graphic objects indicating service providers or graphic objects informing of the Pay TV Card among graphic objects included in the Pay TV Card Object.

In response to the user action, the controller (340) controls such that a user interface to input regional information can be displayed (S220). The user interface can include at least one of the graphic user interfaces (1110, 1120) shown in FIG. 11 and the graphic user interfaces (2910, 2920) shown in FIG. 29.

The communications unit (380) receives regional information through the user interface (S230). The step of S230 can include the information changing process displayed in the graphic user interface shown in FIG. 16.

The controller (340) sets regional information of the electronic device based on the received regional information in the step of S230 (S240).

S100 shown in FIG. 31 can include the execution process for a method setting regional information shown in FIG. 32.

The electronic device and its operation method according to the present invention, as mentioned above, are not limited only to those embodiments, but all or some of the embodiments can be selectively combined to realize various modifications.

On the other hand, it is possible that the operation method of the electronic device according to the present invention can realize a code that can be read by the processor of the memory entity that the processor can read, equipped in the electronic device.

The memory entity that the processor can read includes any kinds of memory device that stores data readable by the processor. Examples of the readable memory entity are a ROM, RAM, CD-ROM, magnetic tape, floppy disk, and fiber data storage device, and also carrier wave types like transmission through internet is included. Also, the memory entity readable by the processor is distributed in the computer system connected by network and the code readable by the processor by the distribution method can be stored and executed.

Also, although the appropriate embodiments of the present invention are explained, the present invention is not limited only to the aforementioned specified embodiments, and it will be apparent to those skilled in the art that various modifications and variations can be made in the present invention without departing from the main point of the present invention which claims within the scope of its claims. Thus, such modifications and variations may not be individually interpreted without departing from the spirit or scope of the inventions.

What is claimed is:

1. A method of controlling a smart television, the method comprising:
    displaying, via a display, a virtual user interface for inputting a zip code;
    transmitting, via a network interface, the input zip code to a server, and receive information about service providers related to the input zip code from the server;
    displaying, via the display, information corresponding to first service providers which are able to provide a service to a specific electronic device regardless of a region of the input zip code based on the received information; and
    displaying, via the display, information corresponding to second service providers which are able to provide a service to the specific electronic device in a certain region based on the received information,
    wherein the information corresponding to the second service providers includes:
    first information, wherein the first information indicates if a corresponding second service provider among the second service providers is able to provide the service to the specific electronic device in the region of the input zip code, and
    second information, wherein the second information indicates if a corresponding second service provider among the second service providers is not able to provide the service to the specific electronic device in the region of the input zip code.

2. The method of claim 1, further comprising:
    receiving a command for selecting the corresponding second service provider that is able to provide the service to the specific electronic device in the region of the input zip code; and
    displaying a specific graphic object indicating the selected corresponding second service provider on a home page of the smart television.

3. The method of claim 1, further comprising:
    receiving a command for selecting the corresponding second service provider that is able to provide the service to the specific electronic device in the region of the input zip code; and
    displaying, via the display, at least one content image including a recommendation for the selected corresponding second service provider.

4. The method of claim 1, further comprising:
    displaying a graphic user interface for indicating that a network connection is required.

5. The method of claim 1, further comprising:
    storing a gesture operation program in a memory,
    wherein the gesture operation program senses occurrence of multiple gestures and includes commands informing at least one software agent of actions to be taken in response to the multiple gestures.

6. The method of claim 5, wherein the first and second commands are recognized based on the gesture operation program stored in the memory.

7. The method of claim 1, further comprising:
    displaying a Pay TV Card Object including one or more graphic objects indicating a service provider;
    receiving a user input for selecting one of the graphic objects;
    displaying the user interface in response to the user input; and receiving information through the displayed user interface.

8. The method of claim 7, wherein the displayed Pay TV Card Object comprises a graphic object indicating a service provider providing all regions service and the graphic object is enabled.

9. The method of claim 7, wherein the displayed Pay TV Card Object comprises information or a graphic indicator indicating a service provider providing pre-subscribed services.

10. The method of claim 1, wherein the received information about the service providers comprises at least one of an identifier identifying service providers, names of the service providers, addresses for connecting to the service providers, type information of the service providers, information about a region which the service providers provide services to, and charging information of the service providers.

11. The method of claim 1, wherein the first information is displayed to indicate the corresponding second service provider is able to be selected, and
wherein the second information is displayed to indicate the corresponding second service provider is not able to be selected.

12. A smart television comprising:
a display configured to display a virtual user interface for inputting a zip code,
a network interface configured to transmit the input zip code to a server, and receive information about service providers related to the input zip code from the server; and
a controller configured to:
display information corresponding to first service providers which are able to provide a service to a specific electronic device regardless of a region of the input zip code based on the received information, and
display information corresponding to second service providers which are able to provide a service to the specific electronic device in a certain region based on the received information,
wherein the information corresponding to the second service providers includes:
first information, wherein the first information indicates if a corresponding second service provider among the second service providers is able to provide the service to the specific electronic device in the region of the input zip code, and
second information, wherein the second information indicates if a corresponding second service provider among the second service providers is not able to provide the service to the specific electronic device in the region of the input zip code.

13. The smart television of claim 12, wherein the controller is further configured to:
receive a command for selecting the corresponding second service provider that is able to provide the service to the specific electronic device in the region of the input zip code, and
display a specific graphic object indicating the selected corresponding second service provider on a home page of the smart television.

14. The smart television of claim 13, wherein the controller is further configured to:
receive a command for selecting the corresponding second service provider that is able to provide the service to the specific electronic device in the region of the input zip code, and
display at least one content image on the display including a recommendation for the selected corresponding second service provider.

15. The smart television of claim 12, wherein the controller is further configured to:
display a graphic user interface on the display for indicating that a network connection is required.

16. The smart television of claim 12, further comprising:
a memory configured to store a gesture operation program for sensing occurrence of multiple gestures and including commands informing at least one software agent of actions to be taken in response to the multiple gestures.

17. The smart television of claim 16, wherein the controller is further configured to:
recognize the first and second commands based on the gesture operation program stored in the memory.

18. The smart television of claim 12, wherein the first information is displayed to indicate the corresponding second service provider is able to be selected, and
wherein the second information is displayed to indicate the corresponding second service provider is not able to be selected.

* * * * *